US005259254A

United States Patent [19]

Zhu et al.

[11] Patent Number: 5,259,254

[45] Date of Patent: Nov. 9, 1993

[54] SAMPLE INTRODUCTION SYSTEM FOR INDUCTIVELY COUPLED PLASMA AND OTHER GAS-PHASE, OR PARTICLE, DETECTORS UTILIZING ULTRASONIC NEBULIZATION, AND METHOD OF USE

[75] Inventors: Jianzhong Zhu; John E. Sutton, both of Omaha, Nebr.

[73] Assignee: Cetac Technologies, Inc., Omaha, Nebr.

[21] Appl. No.: 766,049

[22] Filed: Sep. 25, 1991

[51] Int. Cl.[5] ........................ G01N 1/28; G01N 35/00; H01J 49/26; B05B 1/02

[52] U.S. Cl. .............................. 73/864.81; 73/863.12; 73/863.23; 239/102.2; 250/288

[58] Field of Search ........... 73/863.11, 863.12, 864.81, 73/864.87, 863.23, 863.24, 863.25; 250/288 R, 288 A; 239/102.2; 261/78.2, DIG. 48

[56] References Cited

U.S. PATENT DOCUMENTS

| | | | |
|---|---|---|---|
| 3,367,850 | 2/1968 | Johnson | 73/863.23 X |
| 3,697,748 | 10/1972 | Cohen | 250/288 X |
| 3,735,558 | 5/1973 | Sharstrom et al. | 55/16 |
| 3,812,854 | 5/1974 | Michaels et al. | 239/102.2 X |
| 3,866,831 | 2/1975 | Denton | 293/102.2 X |
| 3,958,883 | 5/1976 | Turner | 356/316 |
| 4,109,863 | 8/1978 | Olsen et al. | 239/102 |
| 4,383,171 | 5/1983 | Shina et al. | 250/288 X |
| 4,495,433 | 1/1985 | Sheridan | 73/1 DV X |
| 4,575,609 | 8/1986 | Fassel et al. | 219/121 PY |
| 4,629,478 | 12/1986 | Browner et al. | 250/288 X |
| 4,730,111 | 3/1988 | Vestal et al. | 250/288 A |
| 4,801,430 | 1/1989 | Robbat et al. | 250/288 X |
| 4,861,988 | 8/1989 | Henion et al. | 250/288 |
| 4,863,491 | 9/1989 | Brandt et al. | 250/288 X |

(List continued on next page.)

FOREIGN PATENT DOCUMENTS

| | | | |
|---|---|---|---|
| 200258 | 11/1986 | European Pat. Off. | 239/102.2 |
| 3501077 | 7/1986 | Fed. Rep. of Germany | 239/102.2 |
| 12475 | 1/1980 | Japan | 73/863.23 |

(List continued on next page.)

OTHER PUBLICATIONS

Glass Frit Nebulizers for Atomic Spectrometry by Layman and Lichte, Anal Chem, p. 638-642, vol. 54, No. 4, Apr. 1982.

Ultrasonic Nebulization of Liquid Samples for Analytical Inductively Coupled Plasma-Atomic Spectroscopy: An Update, by Fassel and Bear, Spec. Aria, 1986, pp. 1089-1113, vol. 41B, No. 10.

(List continued on next page.)

*Primary Examiner*—Tom Noland

*Attorney, Agent, or Firm*—James D. Welch

[57] ABSTRACT

An efficient sample introduction system and method of use, for accepting liquid sample solutions, nebulizing them to form nebulized sample solution droplets, and introducing the nebulized sample solution droplets to sample analysis systems is disclosed. In the preferred embodiment desolvation of produced nebulized sample solution droplets, and solvent removal, to provide nebulized sample particles is performed prior to entering sample to a sample analysis system. Nebulization of sample solutions is accomplished by use of high efficiency ultrasonic nebulizers and solvent removal is accomplished by use of high efficiency enclosed filter and solvent vapor removal gas flow or low temperature condenser systems. The sample introduction system provides improved sample solution nebulization, desolvation and solvent removal, as well as reduced sample loss and carry-over of sample from one analysis procedure to a subsequent analysis procedure, as compared to other systems which perform a similar overall function. The sample introduction system also enhances transport of sample through the sample introduction system to a sample analysis system. The present invention is equally effective with sample solutions in which the sample solvent is either water, or an organic solvent. The preferred embodiment of the present invention also teaches air cooling of the vibrational energy producing elements; and vibrational energy directing and focusing element which serves to increase the operational efficiency and lifetime of the ultrasonic nebulizer.

51 Claims, 2 Drawing Sheets

U.S. PATENT DOCUMENTS

| | | | |
|---|---|---|---|
| 4,883,958 | 1/1989 | Vestal | 250/288 |
| 4,935,624 | 6/1990 | Henion et al. | 250/288 |
| 4,958,529 | 9/1990 | Vestal | 73/864.81 |
| 4,968,885 | 11/1990 | Willoughby | 250/288 |
| 4,977,785 | 12/1990 | Willoughby et al. | 73/863.12 |
| 4,980,057 | 12/1990 | Dorn et al. | 210/198.2 |
| 5,015,845 | 5/1991 | Allen et al. | 250/288 |
| 5,033,541 | 7/1991 | D'Silva | 165/155 |
| 5,051,583 | 9/1991 | Mimura et al. | 250/281 X |

FOREIGN PATENT DOCUMENTS

| | | | |
|---|---|---|---|
| 38941 | 2/1990 | Japan | 73/863.12 |
| 716576 | 2/1980 | U.S.S.R. | 261/DIG. 48 |
| 1072913 | 2/1984 | U.S.S.R. | 239/102.2 |
| 1192862 | 11/1985 | U.S.S.R. | 239/102.2 |

OTHER PUBLICATIONS

Design of a New Ultrasonic Nebulizer for Routine Analysis in ICP-AES, by Mermet and Trassy, Dev. Atomic Plasma Anal. Proc. Winter Conference, 1980, pp. 245-250.

Modified Ultrasonic Nebulizer for Inductively Coupled Argon Plasma Atomic Emission Spectrometry, by Goulden and Anthony, Anal. Chem., Nov. 1984, pp. 2327-2329 vol. 56, No. 13.

Ultrasonic Micronebulizer Interface for High-Performance Liquid Chromatography with Flame Photometric Detection, by Karnicky and Zitelli, Anal. Chem. Jan. 1987, pp. 327-333, vol. 59, No. 2.

Efficiency of Molecular Separators for Interfacing a Gas Chromatograph with a Mass Spectrometer, by Grayson and Wolf, Anal. Chem., Oct. 1967, pp. 141-144, vol. 39, No. 12.

An Ultrasonic Nebulizer for Microliter Samples in Inductively Coupled Plasma Emission Spectrometry, by Kawaguchi, Tanaka and Mizuike, Bull. Chem. Soc. Jr., Sep. 1982 pp. 3033-3034, vol. 55, No. 9.

Emission Spectrometric Detection of the Elements at the Nanogram per Mililiter Level Using Induction-Coupled Plasma Excitation, by Dickinson and Fassel, Anal. Chem., Jul. 1969, pp. 1021-1024, vol. 41, No. 8.

Induction-Coupled Plasma Spectrometric Excitation Source, by Fassel, Anal. Chem., 1966, pp. 920-922.

Continuous Ultrasonic Nebulization and Spectrographic Analysis of Molten Metals, by Fassel and Dickenson Anal. Chem., Jan. 1968, pp. 247-249, vol. 40, No. 1.

Ultrasonic Nebulization in a Low-Emission Flame for Atomic Fluorescence Spectrometry, by Denton and Malmstadt, Anal. Chem., Sep. 1972, pp. 1813-1818, vol. 44, No. 11.

An Efficient and Inexpensive Ultrasonic Nebulizer for Atomic Spectrometry, by Jin, Zhu, Brushwyler and Hieftje, App. Spec., 1990, pp. 183-186, vol. 44, No. 2.

Multielement Detection Limits and Sample Nebulization Efficiencies of an Improved Ultrasonic Nebulizer and a Conventional Pneumatic Nebulizer in Inductively Coupled Plasma-Atomic Emission Spectrometry, by Olsen, Hass and Fassel, Anal. Chem., Apr. 1977, pp. 832-837, vol. 49, No. 4.

Hydraulic High Pressure Nebulization System For Sample Introduction in Atomic Spectroscopy, by Knauer, pp. 1-4, pub. by Sep. 1991.

Characterization and Optimization of a Direct Injection Nebulizer for Introduction of Organic Solvents and Volatile Analyte Species into Inductively Coupled Plasma, by Avery, Chakarabarty and Thompsom, App. Spec., 1990, pp. 1690-1698, vol. 44, No. 10.

An Improved Ultrasonic Nebulizer System for the Generation of High Density Aerosol Dispersion, by Denton and Swartz, pp. 81-83 pub by Sep. 1991.

Etude et Adaptation d'une Source de Plasma Induit Par Haute Frequence, by Diemiaszonek, Moulton and Trassy, Analusis, 1979, pp. 96-103, vol. 7, No. 2.

Investigations into the use of a Pulse Ultrasonic Nebulizer-Burner System for Atomic Absorption Spectrometry, by Korte and Moyers, Anal. Chem., Mar. 1973, pp. 530-534, vol. 45, No. 3.

Characterization of a Membrane Interface for Sample Introduction into Atom Resivoirs for Analytical Atomic Spectrometry, by Gustavsson, Spec. Acta., 1988, pp. 917-922, vol. 43B No. 8.

Emission Spectrometry of Solutions and Powders with a High-Frequency Plasma Source, pp. 1153-1155, Hoore et al., vol. 34, No. 10, Aug. 1967, *Analytical Chemistry*.

Ultrasound, its Chemical, Physical, and Biological Effects edited by Kenneth S. Suskind, VCH Publishers, 1988, pp. 77-80.

Perma Pure Bulletin No. 106, "Mini-Dryers—Model MD" 4 pages published by Sep. 1991.

"Continuous Filtering, Coalescing and Drying of Process Gases" pp. 1-8, Perma Pare Products, Inc. bulletin published by Sep. 1991, by Jack Kertzman.

"Evaluation of the Perma-Pure Dryer for Drying out Stack Gases", pp. 1-12, by F. J. Cassidy at Exxon Research and Engineering Company, AID.8BA.74, Aug. 19, 1974.

SAMPLE INTRODUCTION SYSTEM FOR INDUCTIVELY COUPLED PLASMA AND OTHER GAS-PHASE, OR PARTICLE, DETECTORS UTILIZING ULTRASONIC NEBULIZATION, AND METHOD OF USE

TECHNICAL FIELD

The present invention relates to a system and method of use for introducing liquid samples into gas-phase or particle detectors, such as inductively coupled plasma atomic emission spectrometers and mass spectrometers. More particularly, the present invention is directed to an ultrasonic nebulizer and enclosed filter solvent removal sample introduction system which provides both improved sample nebulization and long term system operational stability, both efficient sample desolvation and enhanced sample transport through the system, as well as reduced sample carry-over from one analysis procedure to a subsequent analysis procedure.

BACKGROUND

The analysis of liquid samples by sample analysis systems which utilize gas-phase or particle detectors, such as inductively coupled plasma (ICP) atomic emission spectrometers, is well known. Typically, such sample analysis systems require that a sample solution first be nebulized into sample solution droplets. The sample solution droplets are then typically desolvated to form nebulized sample particles which are then transported to, and injected into, a detector element of the sample analysis system, wherein the nebulized sample particles are analyzed. In ICP and other plasma sample analysis systems for example, the nebulized sample particles are injected into a high temperature plasma where they interact with energy present in the plasma to form fragments such as molecules, atoms and/or ions. Electrons in the molecules, atoms and/or ions are excited to higher energy state orbitals by said interaction. When the electrons relax back into their lower energy, more stable state, orbitals, electromagnetic radiation is emitted. The frequency of the emitted electromagnetic radiation is a "fingerprint" of the contents of the sample and the intensity of the emitted electromagnetic radiation is related to the concentration of the components in the sample.

There are numerous existing systems for producing nebulized sample solution droplets, (which are typically desolvated to form nebulized sample particles), for introduction into gas-phase or particle sample analysis systems. These include pneumatic spray nebulizers, thermospray nebulizers, high pressure jet-impact nebulizers, glass or metal frit nebulizers, total consumption nebulizers and ultrasonic nebulizers.

For decades pneumatic spray nebulizers were the most commonly used sample solution nebulizer systems for introduction of liquid samples in flame and plasma atomic spectrometry, (eg. atomic emission, atomic absorbtion and atomic fluorescence) as well as mass spectrometry. Pneumatic nebulizers operate by introducing a sample solution through a small orifice into a concentrically flowing gas stream. Interaction between the sample solution and the concentrically flowing gas stream causes production of nebulized sample solution droplets. Pneumatic spray nebulizers, however, produce a wide spectrum of sample solution droplets, as regards the diameter thereof, and limited aerosol sample solution droplet per volume density. This is because relatively large diameter sample solution droplets typically leave the pneumatic nebulizer system under the influence of gravity. Sample analysis systems generally, it will be appreciated, operate with greater sensitivity and provide results which are more reproducible when large numbers of nebulized sample solution droplets are presented for analysis therein, which nebulized sample solution droplets are of a relatively constant and small, (eg. 13 microns or less) diameter. This is because smaller droplets provide smaller desolvated sample particles which are more easily fragmented to produce molecules, atom and/or ions. It is noted that the diameters of sample solution droplets formed by a pneumatic nebulization process are dependent on the concentrically flowing gas flow rate and on the size of the small orifice.

A more recently developed approach to nebulizing sample solutions involves use of thermospray nebulizers. Thermospray nebulizers control the temperature of the tip of a capillary tube such that solvent in a sample solution presented thereto, through said capillary tube, is caused to vaporize. The result of said solvent vaporization is formation of nebulized sample solution droplets. Thermospray nebulizers are typically used with mass spectrometer analysis systems as they operate best in low pressures, such as those present at the inlet stages of mass spectrometers. U.S. Pat. Nos. 4,883,958 and 4,958,529 and 4,730,111 to Vestal describe such nebulizing systems. It is noted that the diameters of sample solution droplets formed by the thermospray process are dependent upon the temperature of the capillary tube. It is also noted that the use of elevated temperatures can degrade sample analytes.

A Patent to Willoughby, U.S. Pat. No. 4,968,885 teaches a nebulizing system which uses both thermospray and pneumatic means. Sample solution droplets produced by the process of this nebulizing system have diameters which depend on both temperature and a gas flow rate.

A jet-impact nebulizing system is described by Doherty et al. at (Appl. Spec. 38, 405-412, 1984). Said sample solution nebulizing system operates by forcing a sample solution through a nozzel which has an orifice therein on the order of twenty-five (25) to sixty (60) microns in diameter. The ejected sample solution impacts a wall and the interaction therewith causes formation of sample solution droplets. Again, sample solution droplet diameters depend on a flow rate as well as a driving pressure.

A glass frit nebulizer system is described by Layman et al. (Anal. Chem. 54, 638, 1982). A porous glass frit with numerous pores of a diameter from four (4) to eight (8) microns therethrough is positioned in the flow path of a sample solution. Sample solution which emerges therefrom is highly nebulized but the flow rate of the sample solution is typically low, (eg. five (5) to fifty (50) microliters/min). While providing well nebulized sample solution droplets, this nebulizer system is prone to inconsistent sample solution flow rates, and must be subjected to repeated wash cycles between applications. It is noted that sample solution droplet diameters are dependent on a driving sample solution pressure.

Total consumption nebulizing systems are taught in U.S. Pat. No. 4,575,609 to Fassel et al., and by Baldwin and McLafferty (Org. Mass Spect. 7, 1353, 1973). These nebulizing systems have the important advantage of being able to provide all of the analyte in a sample solution entered thereto, to the detector element in an analysis system. Sample carry-over from one analysis procedure to a subsequent analysis procedure is also minimized by the relatively very small internal volume thereof. Very low flow rate capacity, (eg. one (1) to one-hundred (100) microliters/min), however, limits the total amount of analyte in a sample solution entered thereto which can reach a detection element in an analysis system. As a result analysis system sensitivity is not greatly improved by their use. It is noted that sample solution droplet diameters depend on a pressure driven sample solution flow rate.

The above presentation shows that the nebulizing systems surveyed present with various operational limitations. For instance, sample solution droplets produced by pneumatic, jet-impact and thermospray nebulizer systems, or combinations of thereof, have diameters which are dependent on gas flow rates or potentially sample degrading high temperatures. In addition, the glass frit and total consumption sample solution nebulizers have inherent limitations as regards the amount of sample which they can nebulize and depend on a sample solution driving pressure to control sample solution droplet diameters. Said limited sample handling capability in these systems leads to a limit on the sensitivity of sample analysis systems which utilize them. An efficient sample solution nebulizer system which would produce droplets with diameters determined by some independent variables other than a potentially sample analyte degrading elevated temperature, and which allows high sample volume flow handling capabilities would therefore be of utility. The identified attributes are associated with ultrasonic nebulizer systems.

Briefly, ultrasonic nebulizer systems generally provide means to impinge a sample solution onto, or in close proximity to a vibrating piezoelectric crystal or equivalent which is a part of an oscillator circuit. Typically the oscillator circuit system is calibrated so that radio frequency vibrations are produced. Interaction between the vibrational energy produced by the vibrating piezoelectric crystal or equivalent and the impinging sample solution causes the later to become nebulized into sample solution droplets as a result of the instability of the liquid-gas interface when exposed to a perpendicular force.

It is important to understand that the sample solution droplets produced by ultrasonic nebulizers have diameters which depend on the frequency of vibration of the piezoelectric crystal or equivalent, and that when the frequency of vibration is set to a megahertz level, a theoretically large number (eg. seventy (70%) percent) of sample solution droplets can be formed with a relatively small uniform diameter of thirteen (13) microns or less. The important limitations of the sample solution nebulizer systems disclosed above are not present, (eg. sample solution droplet diameters are not dependent on potentially sample analyte degrading elevated temperatures or any flow rates or pressures). Ultrasonic sample solution nebulizing systems are also capable of handling relatively high sample flows, and the sample solution droplet diameters produced by ultrasonic nebulizer system also tend to be more consistent than the diameters of sample solution droplets produced by other nebulizing systems. In addition, the conversion rate of sample solution to nebulized sample solution droplets is theoretically relatively high, being higher than ten (10) to fifty (50%) percent as compared to approximately two (2%) percent when pneumatic nebulizer systems are used.

The presence of a far larger number and proportion of sample solution droplets with relatively small diameters means two things. First, less sample analyte is lost as a result of relatively large droplets falling away from entry to a detector element in a sample analysis system under the influence of gravity, hence, more sample analyte will be presented to said detector element; and second, the presence of smaller diameter sample solution droplets leads to production of smaller desolvated sample particles which are easier to fragment into molecules, atoms and/or ions for analysis. A larger amount of sample analyte is thus produced per fragmented sample particle. As a result, the sensitivity of a sample analysis system is improved when ultrasonic sample solution nebulizers are used, rather than other sample solution nebulizer systems.

A Patent to Olsen et al., U.S. Pat. No. 4,109,863 describes an ultrasonic nebulizer system in which a piezoelectric crystal or equivalent, (termed a transducer in Olsen et al.) is secured to the inner surface of a glass plate, which glass plate forms a leading portion of an enclosed hollow body, which hollow body is positioned in an aerosol chamber. The purpose of the glass plate is to provide the transducer protection against corrosion etc. which can result from contact with components in sample solutions. The glass plate thickness is typically one-half (0.5) wavelengths of the transducer vibrational wavelength utilized. This thickness optimizes effective transfer of vibrational energy therethrough. During use a sample solution is impinged upon the outer aspect of the glass plate, inside the aerosol chamber, rather than onto the transducer per se. The transducer is caused to vibrate and the interaction between the impinging sample solution and the vibrational energy produced causes production of nebulized sample solution droplets. In addition, a liquid coolant is circulated within the hollow body to maintain the transducer at a desired temperature. Problems which users of the Olsen et al. invention have experienced result from the use of a liquid to cool the transducer, and the use of a carrier gas injected from below the location of the transducer in the aerosol chamber. (It is noted that said carrier gas serves to sweep nebulized sample solution droplets toward a detector element in an analysis system). Even though the piezoelectric crystal is oriented vertically, bubbles tend to form on the back side of the transducer during use, resulting in uneven cooling of the transducer. This leads to reduced operational efficiency and lifetime of the transducer. In addition, the electrical leads to the transducer, from the other components of an oscillator circuit, pass through the cooling liquid, and they tend to become corroded during use. Continuing, injecting a carrier gas into the aerosol chamber from a position below the location of the piezoelectric crystal or equivalent, as is done in the Olsen et al. ultrasonic nebulizer system, leads to pulsations in the volume density of the aerosol sample solution droplets which ar produced over time which are available to sample analysis systems. In addition, the hollow body of the Olsen et al. invention is attached to the aerosol chamber thereof in a manner which creates "crevasses" therebetween. Sample from one analysis procedure can accumulate in the crevasses and by a "carry-over" capillary action or "wicking" effect be released and contaminate analysis results In subsequent analysis procedures. Continuing, the Olsen et al. invention directs nebulized sample solution droplet flow toward solvent vaporization, desolvation and sample analysis system detector elements by way of a relatively small diameter orifice. Turbulence results when the nebulized sample solution droplets pass through said relatively small diameter orifice and nebulized sample solution droplets are caused to reagglomerate, and are lost, as a result thereof. Finally, the hollow body construction of the Olsen et al. invention does not provide any vibrational energy focusing capability, since the vibrational energy produced by the transducer is emitted in all directions therefrom, without any means being present to redirect any of said vibrational energy.

A patent to Dorn et al. U.S. Pat. No. 4,980,057 describes a sample solution nebulizer system which uses both ultrasonic and pneumatic means to nebulize sample solutions. A one-sixteenth (1/16) inch stainless steel tube is placed in the center of an ultrasonic nebulizer probe and serves to concentrate the vibrational energy produced by an ultrasonic transducer present therearound. A fused silica capillary tube is placed inside the one-sixteenth (1/16) inch stainless steel tube to, during use, deliver a high velocity gas stream to the tip of the ultrasonic nebulizer probe. Also during use, the sample solution is introduced to the surface of the ultrasonic nebulizer probe. Interaction between the sample solution, vibrational energy and high velocity gas stream causes the sample solution to be nebulized into sample solution droplets. It is noted that this system probably can not utilize megahertz level frequencies as the ultrasonic nebulizer probe is not of a small enough dimension, (eg. on the order of half a wavelength of a megahertz vibrational frequency), to efficiently transmit megahertz wavelength vibrational energy waves to the location at which the sample solution is entered to the system. The Dorn et al. Patent teaches the use of one-hundred-and-twenty (120 KHZ) Kilohertz operational frequency. In addition, this system produces sample solution droplets, the diameters of which are affected by the flow rate of the sample solution nebulizing gas, as is the case with any pneumatic type sample solution nebulizing system.

A paper by Goulden et al. (Anal. Chem 56, 2327–2329, 1984) describes a modified ultrasonic nebulizer. The piezoelectric crystal or equivalent, termed a transducer in the Goulden paper, is oriented horizontally at the upper aspect of a glass container. A rubber stopper is placed below the transducer, inside the walls of the glass container. The rubber stopper has a vertically oriented centrally located hole therethrough such that a large amount of cooling water, (eg. one-half (0.5) l/min) can be caused to flow vertically upward through said vertically oriented centrally located hole in the rubber stopper, into the space between the lower surface of the transducer and the upper surface of the rubber stopper, and out thereof around the edges of the rubber stopper and inside the glass container. The purpose of the described arrangement is to prevent bubbles from accumulating under the transducer during use, and thereby avoid instabilities of operation and reduced transducer lifetime.

A paper by Karnicky et al. (Anal. Chem., 59, 327–333, 1987) describes another design for an ultrasonic nebulizer. An enclosed chamber has, at a distance above the inside surface of its lower extent, a piezoelectric crystal or equivalent, termed an ultrasonic transducer in the Karnicky paper, which ultrasonic transducer fits snugly within the inner side walls of the enclosed chamber. Air is present between the upper surface of the lower extent of the enclosed Chamber, and the lower surface of the ultrasonic transducer, but between the upper surface of the ultrasonic transducer and the lower surface of a glass diaphragm which is present at the upper aspect of the enclosed chamber, there exists a space through which cooling water is flowed during use. The ultrasonic transducer is shaped concave upward so that vibrational energy produced thereby during use is directed to and focused upon the glass diaphragm through the cooling water. An enclosed sample solution entry and carrier gas entry assembly mounts to the enclosed chamber above the location of the glass diaphram. During use the enclosed chamber with ultrasonic transducer therein, and with the enclosed sample solution and carrier gas entry assembly mounted thereto is oriented with its longitudinal axis at an approximate forty-five degree angle to an underlying horizontal surface. A sample solution is entered so that it impinges on the outer surface of the glass diaphragm at an approximate forty-five degree angle thereto. Interaction between vibrational energy produced by the ultrasonic transducer and the impinging sample solution produces nebulized sample solution droplets which are then transported to desolvation and solvent removal systems under the influence of a pressure gradient created by the entering of a carrier gas flow to the enclosed sample solution and carrier gas entry assembly. It is also noted that the Karnicky system provides a wick which contacts the outer surface of the glass diaphragm to drain away sample solution which is not nebulized during use.

Another paper, by Mermet et al. (Dev. Atomic plasma Spec. Anal. proc. Winter Conference, 245–250, 1980), describes yet another design for an ultrasonic nebulizer system. A piezoelectric crystal or equivalent, termed a transducer in the Mermet paper, is present within a waveguide structure which decreases in inner diameter along its upwardly projecting longitudinal axis, near the lower extent thereof. The internal waveguide structure is thus, conical in shape, and during use is filled with a vibrational energy transmitting bath. Said waveguide structure shape plays the role of an impedance transformer and use of low electrical power levels, (eg. five (5) to seven (7) watts) to effect sample solution nebulization is made possibly, thereby reducing transducer cooling requirements. At the upper extent of said waveguide structure is present a nebulization cell, the lower extent of which is made from a thin membrane of ethylene polyterephtalate (Mylar, Terphane) which is transparent to ultrasonic energy vibrational energy. During use a sample solution is entered to the nebulization cell and vibrational energy produced by the transducer is directed by the waveguide structure through the vibrational energy transmitting bath into the nebulization cell where it interacts with the entered sample solution to form sample solution droplets. Said nebulized sample solution droplets are then transported to additional sample preparation stages under the influence of a pressure gradient created by entering a carrier gas flow to the nebulization chamber.

The above summary of relevant references shows that while ultrasonic nebulizer systems provide benefits as compared to other nebulization systems, problems still exist. Problems with operational stability and piezoelectric crystal or equivalent lifetime develop as a result of uneven cooling thereof during use, when bubbles form in a cooling liquid where it meets the piezoelectric crystal or equivalent. In addition, ultrasonic energy produced by a vibrating piezoelectric crystal or equivalent in most ultrasonic nebulizer systems is not well directed for use in nebulizing a samplė solution, to a point at which a sample solution is present. Other problems result from injecting a carrier gas meant to carry nebulized sample solution droplets toward a detector in a sample analysis system, at nonoptimum locations and in nonoptimum directions. This leads to formation of turbulence in nebulized sample solution droplet flows and accompanying reagglomeration of nebulized sample solution droplets This effect is worsened by the presence of relatively small orifices in the flow paths of nebulized sample solution droplets present in the aerosol chambers of some inventions. Also, the presence of crevasses in the aerosol chamber of some inventions leads to sample carry-over from one analysis procedure to a subsequent analysis procedure. Additional complications result, in some inventions, from the use of pneumatic nebulization means in addition to ultrasonic means, and from the use of system geometry which limits the ultrasonic nebulizer operational frequency to less than megahertz levels.

Continuing, as mentioned at the outset, sample preparation for introduction to a detector element in a sample analysis system typically involves not only a sample solution nebulization step, but also sample desolvation and solvent removal steps. Nebulized sample solution droplets are typically desolvated prior to being entered, for instance, to an ICP. If this is not done, plasma instability and spectra emission interference can occur in plasma based analysis systems, and solvent outgassing in MS systems can cause pressures therein to rise to unacceptable levels.

Desolvation of sample solution droplets involves two processes. First, sample solution droplets are heated to vaporize solvent present and provide a mixture of solvent vapor and nebulized sample particles; and second, the solvent vapor is removed. The most common approach to removing solvent is by use of low temperature condenser systems. Briefly, in said low temperature condenser systems the nebulized sample solution droplets are heated to vaporize the solvent present, and then the resulting mixture of solvent vapor and nebulized sample particles is passed through a low temperature solvent removal system condenser. When the solvent present is water very high desolvation efficiency, (eg. ninty-nine (99%) percent), is typically achieved, when the solvent condensing temperature is set to zero (0) to minus-five (−5) degrees centigrade. However, when organic solvents are present the desolvation efficiency at the indicated temperatures is typically reduced to less than fifty (50%) percent. Use of lower temperatures, (eg. minus-seventy (−70) degrees centigrade), can improve the solvent removal efficiency, but will also cause greater loss of nebulized sample particles as an undesirable accompanying effect. In addition, low temperature desolvation systems typically comprise a relatively large volume condenser. This leads to sample "carry-over" problems from one analysis procedure to a subsequent analysis procedure as it is difficult to fully flush out the relatively large volume between analysis procedures.

A Patent to D'Silva, U.S. Pat. No. 5,033,541 describes a high efficiency double pass tandem cooling aerosol condenser desolvation system which has been successfully used to desolvate ultrasonically nebulized sample droplets. This invention presents a relatively small internal condenser volume, hence minimizes sample carry-over problems, however, while the invention operates at high desolvation efficiencies when water is the solvent involved, it still operates at lower desolvation efficiencies when organic solvents are used. The invention also requires sample passing therethrough to undergo turbulance creating direction reversals, and the use of relatively expensive refrigeration equipments. Turbulance in a nebulized sample flow path can cause reagglomeration of nebulized sample solution droplets and, especially when very low temperatures are present, recapture of nebulized desolvated sample particles present.

A Patent to Skarstrom et al., U.S. Pat. No. 3,735,558 describes a counter-flow hollow tube(s) enclosed filter, mixed fluids key component removal system. Briefly, the invention operates to cause separation of key components from mixed fluids, such as water vapor from air, by entering the mixed fluid at one end of a single, or a series of, hollow tube(s), the walls of which are selectively permeable to the key components of the mixed fluid which are to be removed. A gas is entered to the system at the opposite end of the hollow tube(s), which gas is caused to flow over the outside of the hollow tube(s) in a direction counter to that of the mixed fluids, to provide an external purge of the key components of the mixed fluid which diffuse across the hollow tube(s). Diffusion of key components is driven by pressure and concentration gradients across the hollow tube(s . This approach to removal of diffusing components does not require the presence of low temperature producing refrigeration equipments, and presents a relatively small internal volume.

Two Patents to Vestal, U.S. Pat. Nos. 4,958,529 and 4,883,958 also describe systems which utilize counter-flow enclosed filters systems, with the application being to remove solvent vapor from nebulized samples produced by a spraying technique. The Vestal Patents state that the properties of the filter material used are not critical to the operation of the invention, but suggest the use of filter material available under the tradename of ZITEX. Said filter material provides a pore size of from two (2) to five (5) microns with a corresponding porosity of up to sixty (60%) percent. ZITEX is typically available in sheet form and enclosed filters made therefrom are typically constructed from a multiplicity of spacers and two sheets thereof. To provide an enclosed filter which is sufficiently long to provide reliable solvent vapor removal, in a reasonable space, it is typically necessary to arrange the spacers in a pattern which requires many severe sample flow path direction changes. A flow of solvent vapor and nebulized sample particles passing through such a tortuous pathway experiences turbulance. Turbulance causes sample to adhere and accumulate inside the enclosed filter thereby causing sample carry-over problems. The Vestal Patents also describe the heating of the enclosed filter to further assure continuous vaporization of solvent vapor present therein, and the flow of a gas outside the enclosed filter to remove solvent which diffuses through the enclosed filter.

The above presentation shows that the preparation of liquid samples for analysis in gas phase or particle analysis systems typically involves:

1. Nebulizing a sample solution to form sample solution droplets.

2. Desolvating the resulting nebulized sample solution droplets and removal of the solvent.

3. Transporting the sample through the nebulizing system, desolvation and solvent removal systems into a detector of an analysis system.

4. Doing the above with varying degrees of success as regards use with either water or organic solvents, minimizing sample carry-over from one analysis procedure to a subsequent analysis procedure and achieving long term stability of operation.

In view of the above it can be concluded that a sample introduction system which at once: provides high sample solution nebulization efficiency and aerosol conversion rate; produces sample solution droplets with diameters which are determined by an easily controlled independent parameter other than a potentially sample analyte degrading high temperature; allows entry of relatively high sample solution flow; provides more efficient, (more than ninty-nine and nine-tenths (99.9%) percent), desolvation of the produced nebulized sample solution droplets in a manner which is equally successful whether water or organic solvents are present; minimizes sample carry-over by increasing sample transport efficiency therethrough and which optimizes system long term operational stability, would be of great utility. Such a sample introduction system is taught by the present invention.

DISCLOSURE OF THE INVENTION

The need identified in the Background Section of this Disclosure is met by the present invention. The present invention produces nebulized sample solution droplets by use of a high efficiency ultrasonic nebulizer and desolvates the nebulized sample solution droplets produced by use of heat to vaporize sample solvent and by use of an enclosed filter system to remove vaporized solvent, which enclosed filter system is preferably tubular in shape and presents a relatively small internal volume. Briefly, the ultrasonic nebulizer of the present invention is comprised of a piezoelectric crystal or equivalent, which is a part of an electric oscillator circuit. The piezoelectric crystal or equivalent is secured in an aerosol chamber encasement in a manner such that no sample retaining crevasses are present. During use the piezoelectric crystal or equivalent is caused to vibrate at, typically but not necessarily, one-and-three-tenths (1.3) Megahertz. A sample solution is caused to impinge upon, or in close proximity to, the vibrating piezoelectric crystal or equivalent and interact with the vibrational energy produced thereby. As a result of said interaction, nebulized sample solution droplets are produced. Recent tests of the high efficiency ultrasonic nebulizer in the present invention system have shown that seventy (70%) percent of said nebulized sample solution droplets formed from a typical sample solution entered thereto have a diameter of thirteen (13) microns or less when the vibrational frequency of the piezoelectric crystal or equivalent is one-and-three-tenths (1.3) Megahertz. At this frequency it is found that a significant increase in uniform production of nebulized sample droplets with small diameters, as compared to droplets produced when lower frequencies are used, is realized. It is noted that in general, as the frequency of vibration of the piezoelectric crystal or equivalent is increased, the smaller will be the theoretical expected average diameter of the nebulized sample solution droplets which are produced. Theoretically, the diameter of droplets formed by ultrasonic nebulization is generally provided by the equation derived by Lang, (see page 78 in "Ultrasound, its Chemical, Physical and Biological Effects, edited by Kenneth S. Suslick, 1988, VCH Publishers):

$$D=0.34\times((8\times pi\times S)/(FD\times F\times F))^{\frac{1}{3}}$$

where D is diameter, pi is approximated as 3.14, S is surface tension, FD is fluid density and F is frequency of vibration. The droplet formation is considered to result from shocks which originate during cavitation events below the surface of a sample solution, which shocks interact with finite-amplitude capillary surface waves. The present invention thus provides improved sample solution nebulization efficiency over that identified in some of the prior art by identifying a higher ultrasonic nebulizer operating frequency, and making the use thereof practical.

Larger diameter nebulized sample solution droplets produced and present are removed from the system, typically under the influence of gravity, by the way of a drain present in the aerosol chamber in which the piezoelectric crystal or equivalent is present. Remaining relatively small diameter nebulized sample solution droplets are next transported into a desolvation chamber where they are subjected to a heating process at a temperature above that which causes the solvent present to vaporize, thereby producing a mixture of vaporized solvent and nebulized sample particles. Said mixture is next caused to be transported through the previously mentioned enclosed filter, which enclosed filter is of essentially linear geometry, or at worst, of a gradually curving geometry. The sample flow path of the present invention is designed so as not to have any unnecessary constrictions or bends therein. Typically, in the primary embodiment of the present invention, the sample transport alluded to is caused by a pressure gradient induced by entry of a tangentially injected carrier gas into the aerosol chamber near the piezoelectric crystal or equivalent. It is also noted that "tangential" injection is to be understood to mean that the carrier gas follows a spiral-like path locus in the aerosol chamber which is in a direction essentially perpendicular to the surface area of the piezoelectric crystal or equivalent upon which, or in close proximity thereto, a sample solution is caused to be impinged during use. The use of a tangentially directed carrier gas flow reduces sample flow turbulence, hence sample "carry-over" and "sample flow "pulsation" noise producing problems.

The ultrasonic nebulizer of the present invention, as mentioned, provides high efficiency nebulization of sample solutions. The equation of Lang previously presented shows that theoretically a higher frequency of operation is desirable. In view thereof, it should be understood that higher frequencies are not universally used in prior ultrasonic nebulizers because the higher the frequency of operation, the more difficult it is to provide electric power to the piezoelectric crystal or equivalent, and to direct vibrational energy produced thereby to the location of an impinging sample solution. The present invention, as a means to better focusing vibrational energy, provides in the preferred embodiment, a KAPTON (KAPTON is a tradename for a polyimide material) film or equivalent. The KAPTON film or equivalent is positioned behind the piezoelectric crystal or equivalent, with behind taken to mean the side thereof opposite to that upon which a sample solution is impinged during use. Vibrational energy initially directed toward the KAPTON film or equivalent is reflected thereby to a position at which it can be better utilized in the sample nebulization process. The KAPTON film or equivalent serves also as an interface from the piezoelectric crystal or equivalent to a structural heat sink in the aerosol chamber. By providing uniform contact between the piezoelectric crystal or equivalent and the heat sink, efficient and uniform heat removal from the piezoelectric crystal or equivalent is achieved during use. In conjunction with the use of air cooling, this leads to more stable ultrasonic nebulizer performance and longer piezoelectric crystal or equivalent lifetime. The KAPTON film or equivalent also is compressible. By interfacing the piezoelectric crystal or equivalent to the structural heat sink by way of a KAPTON film or equivalent (or multiple layers thereof), the piezoelectric crystal or equivalent is "cushioned" as it vibrates. That is, it does not undergo repeated direct contact with the relatively rigid structural heat sink. This leads to further increases in the piezoelectric crystal or equivalent lifetime, said lifetime being on the order of years rather than weeks, as is the case for piezoelectric crystals or equivalents in some earlier ultrasonic nebulizer systems. The present invention, in the preferred embodiment thereof, also provides a glass insulator on the front of the piezoelectric crystal or equivalent to protect it against corrosion etc. by components present in samples impinged thereon.

Continuing, as mentioned above, the present invention uses an enclosed filter solvent removal system, and the properties of the enclosed filter material composition have been found to be of importance to the operation thereof. The enclosed filter is made from a material which allows the solvent vapor to diffuse therethrough, but which retains the nebulized sample particles therein. In the preferred embodiment of the present invention the material is GORE-TEX, (GORE-TEX is a tradename), micro porous PTFE tubing, manufacturer part No. X12323, No. X12499 or No. X12500. Said GORE-TEX microporous PTFE tubing has inner diameters of approximately four (4), two (2) and one (1) millimeters respectively. Said GORE-TEX microporous tubing filter material is preferred as it simultaneously provides high porosity (eg.-seventy (70%) percent) and small pore size, (eg. one (1) to two (2) microns). The higher the porosity of a material, the easier it is for solvent vapor to diffuse therethrough, and the smaller the pore size of a material, the smaller the nebulized sample particles can be and still be retained within an enclosed filter made thereof as they are transported therethrough. It is difficult to obtain both high porosity and small pore size in a filter material, but said combination has been achieved in the GORE-TEX product and use of same allows shorter length enclosed filters to be used which provide excellent solvent vapor removal characteristics. It should be apparent that a shorter enclosed filter length provides a smaller enclosed volume inside said enclosed filter, and that translates into a reduced chance for nebulized sample particles to adhere to and accumulate within same during use at reasonable sample flow rates therethrough. The present invention operates quite well when the enclosed filter length is forty (40) centimeters or less in length. Said enclosed filter length is five (5) or more fold shorter than enclosed filters providing equivalent desolvation capability which are made from other materials, (eg. filter material available under the tradename of ZITEX for instance). Continuing, the solvent vapor which diffuses across the enclosed filter is flushed out of the system, typically by a flow of gas outside the enclosed filter, while the nebulized sample particles are transported into a sample analysis system, typically under the influence of the pressure gradient which is created by entering of the tangentially injected carrier gas to aerosol chamber of the system near the ultrasonic nebulizer piezoelectric crystal or equivalent, as mentioned above. Note, however, that it is within the scope of a modified embodiment of the present invention to remove solvent vapor which diffuses through the enclosed filter by use of a low temperature condenser through which the enclosed filter extends rather than by way of a flow of gas outside the enclosed filter. If this is done the enclosed filter is maintained at a temperature above that of the solvent involved to prevent solvent condensation and sample analyte deposition and accumulation inside the enclosed filter. The low temperature condenser is, however, maintained below the condensation point of the solvent present. Also, if this is done the pressure gradient which drives the nebulized sample particles transport will typically be created by use of vacuum pumps which reduce pressure at the outlet, sample analysis end of the enclosed filter, and the tangentially injected carrier gas flow mentioned above will not be present. Continuing, when a solvent removal gas flow outside the enclosed filter is used to remove diffused solvent vapor the flow rate thereof is typically set to approximately one (1) liter per minute when the carrier gas flow is set to approximately one-half (0.5) liters per minute and when the sample solution flow into the ultrasonic nebulizer is approximately one (1) mililiter per minute. With said parameters the solvent vapor partial pressure difference across the enclosed filter membrane is kept to an optimum level by quickly removing solvent vapor which diffuses across the enclosed filter membrane. In addition, it must be understood that it is important to keep the enclosed filter temperature above the boiling point of the solvent involved to prevent condensation of solvent vapor therein. When water is used as a solvent the temperature is kept at one-hundred-and-twenty (120) degrees Centigrade or above.

It is also mentioned that use of solvents with boiling points well below the temperature at which a sample of interest evaporates serves to optimize operation of the present invention, and that the present invention is equally effective in desolvating water or organically solvated samples.

The present invention will be better understood by reference to the Detailed Description Section of this Disclosure and the accompanying drawings.

SUMMARY OF THE INVENTION

The capability of gas phase and particle sample analysis systems such as those which use Inductively Coupled Plasmas (ICP's) and Mass Spectrometers (MS) for example, to analyze samples entered thereto is well known. Typically, a sample solution is entered to a sample analysis system by way of sample nebulizing, desolvating and solvent removal systems. The use of pneumatic and mechanical means to nebulize sample solutions and the use of low temperature condensers to remove solvent from resulting nebulized sample solution droplets, which have been heated to vaporize the solvent present, are generally taught. Such desolvating and solvent removal systems, however, are generally not as efficient when an organic solvent is present, as compared to when water is the solvent.

Also taught in various references is the use of ultrasonic nebulizers to nebulize samples. Ultrasonic nebulizers generally comprise a piezoelectric crystal or equivalent which is caused to vibrate. A sample solution is caused to impinge thereon, or in close proximity thereto, inside an aerosol chamber and interaction between the vibrational energy produced by the vibrating piezoelectric crystal or equivalent and the impinging sample solution causes the later to be nebulized into nebulized sample solution droplets. Some ultrasonic nebulizers taught in the prior art, however, typically operate at relatively low frequencies, (eg. in the kilohertz range), and provide less than optimum sample solution nebulization. Recent tests of the present invention ultrasonic nebulizer system, however, have shown that seventy (70%) percent of the sample solution droplets formed thereby have a diameter of thirteen (13) microns or less when the operational frequency is set to one-and-three-tenths (1.3) megahertz.

Various References also teach the use of relatively small volume enclosed filters which allow solvent vapor to diffuse therethrough, but which retain nebulized sample particles which result from the desolvation of nebulized sample solution droplets, therein. Said references do not, however, emphasize that the properties of the material from which an enclosed filter is fabricated, or enclosed filter geometry are critical to system performance. In addition, no known reference teaches that high efficiency ultrasonic nebulizer systems can, or should, be used in conjunction with relatively small volume high efficiency enclosed filter solvent removal systems.

The present invention provides a sample introduction system which combines a highly efficient ultrasonic nebulization system with a highly efficient, essentially geometrically linear, relatively small internal volume, enclosed filter solvent removal system. In use nebulized sample droplets formed by the ultrasonic nebulizer are desolvated by being subjected to heat in a desolvation system and are caused to be transported through the enclosed filter to an analysis system. Solvent vapor diffuses through the enclosed filter and is removed, typically, by a flow of gas outside said high efficiency enclosed filter. In some applications a low temperature condenser, (rather than a solvent removal gas flow outside the enclosed filter), through which the enclosed filter passes might be used to condense and remove said diffused solvent vapor, while the enclosed filter temperature is maintained above the boiling point of the solvent involved. This might be done, for instance, when a mass spectrometer analysis system is used with the present invention.

The high efficiency ultrasonic nebulization system of the present invention includes, in the preferred embodiment, a KAPTON, (KAPTON is a tradename for a polyimide material), film or equivalent, between the piezoelectric Crystal or equivalent and a structural heat sink in an aerosol chamber which houses the piezoelectric crystal or equivalent. The Kapton film or equivalent serves to reflect vibrational energy, not initially so directed, to a location at which it can be better utilized in nebulizing impinging sample solution. The KAPTON film or equivalent also serves as a uniform contact interface between the piezoelectric crystal or equivalent and the structural. Said KAPTON film or equivalent interface provides uniform heat removal from the piezoelectric crystal during use, and serves as a compressible material to buffer contact between the piezoelectric crystal or equivalent and the relatively rigid structural heat sink. The presence of the KAPTON film or equivalent serves to increase the operational efficiency of the present invention and lifetime of the piezoelectric crystal or equivalent. The present invention also uses air cooling by way of the structural heat sink.

The relatively small volume enclosed filter desolvation system is, in the preferred embodiment, comprised of small diameter tubing (eg. one (1) to four (4) milimeters), fabricated from high porosity, small pore size material, typically GORE-TEX, (GORE-TEX is a tradename), Micro porous PTFE tubing. As a result the present invention provides an efficient sample nebulization system in conjunction with a solvent removal system which minimizes sample carry-over from one analysis procedure to subsequent analysis procedures, said carry-over being associated with relatively large desolvation condenser volumes, and even relatively small volume enclosed filter solvent removal systems which make use of inferior filter materials and/or relatively tortuous sample flow path enclosed filter geometries. The present invention also provides a system which does not cause nebulized sample particle recapture during desolvation and solvent removal. This is the result of maintaining the enclosed filter temperature above the boiling point of the solvent involved. It is also emphasized that the desolvation system of the present invention works equally well with water or organic based solvents.

It is therefore a purpose of the present invention to provide a system for introducing samples to sample analysis systems which utilizes efficient sample nebulization means.

It is another purpose of the present invention to provide a system for introducing samples to sample analysis systems which utilizes efficient nebulized sample solution droplet desolvation nd solvent removal means.

It is yet another purpose of the present invention to provide a system for introducing samples to sample analysis systems which minimizes sample carry-over from one sample analysis procedure to a subsequent analysis procedure.

It is still yet another purpose of the present invention to provide a system for introducing samples for entry to sample analysis systems which efficiently transports sample therethrough.

It is another purpose of the present invention to provide a system for introducing samples to sample analysis systems which is equally efficient in desolvating nebulized sample solution droplets whether water or organic solvents are present.

It is yet another purpose of the present invention to provide an ultrasonic nebulization system in which the piezoelectric crystal or equivalent is interfaced to an air cooled structural heat sink by a KAPTON or equivalent film.

It is still yet another purpose of the present invention to provide a system for introducing samples to sample analysis systems which demonstrates stable operation and long component lifetimes.

DETAILED DESCRIPTION

Figure 1:
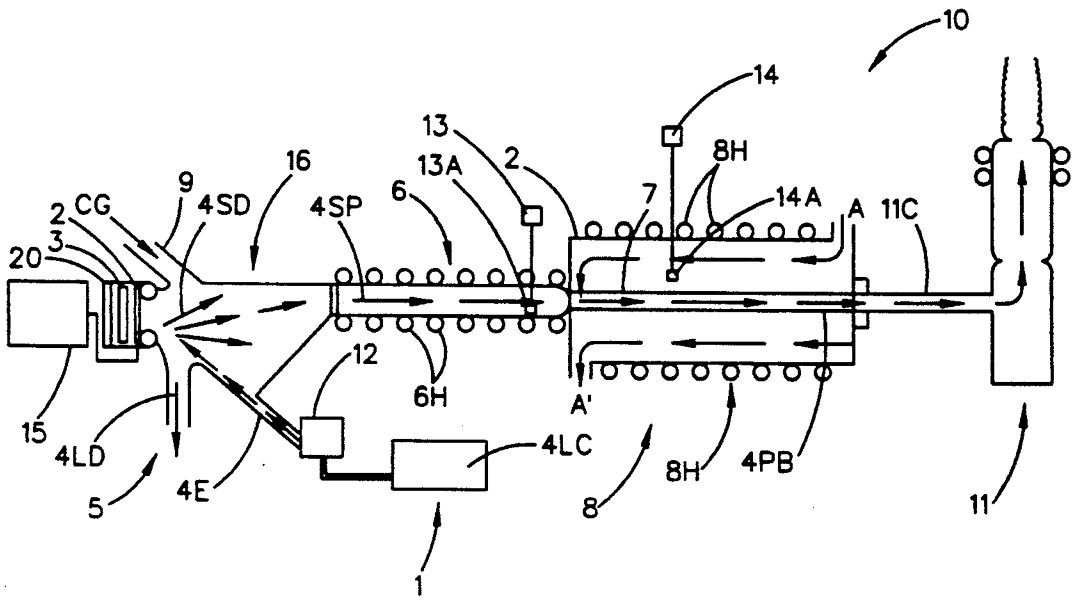
FIG. 1 shows the entire system of the primary embodiment of the present invention in diagramatic form.
Figure 3:
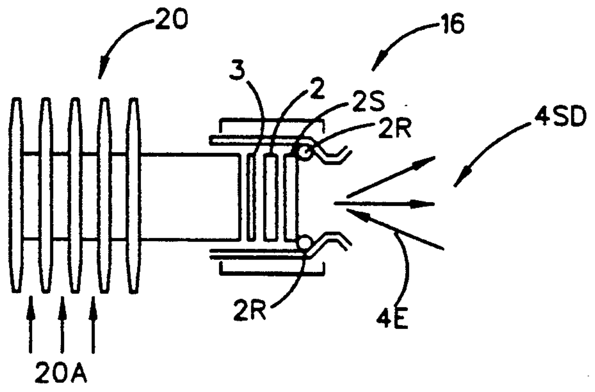
FIG. 3 shows an expanded view of the preferred arrangement of vibrational energy producing associated elements in the ultrasonic nebulizer of the present invention. A KAPTON film or equivalent, piezoelectric crystal or equivalent, insulator and "O" ring are shown in exploded form for easier observation.

Turning now to the Drawings, there is shown in FIG. 1 a diagramatic view, of one embodiment of the overall system of the present ultrasonic nebulizer and enclosed filter solvent removal sample introduction invention (10). A source (1) of sample solution (4LC) is shown attached to means (12) for causing said sample solution (4LC) to impinge upon piezoelectric crystal or equivalent (2) in aerosol chamber system (16). (The sample solution (4LC) can originate from any source of liquid sample). The aerosol chamber (16) provides essentially tubular means for entering a sample solution flow thereto and an impinging sample solution flow is identified by numeral (4E), the flow rate of which is typically, but not necessarily one (1) mililiter per minute. Piezoelectric crystal or equivalent (2) is caused to vibrate, typically but not necessarily at one-and-three-tenths (1.3) Megahertz, by inclusion in an electric power source and oscillator circuit (15). Also shown is a KAPTON film or equivalent KAPTON is a tradename for a polyimide material) (3) which serves to reflect and help focus vibrational energy developed by piezoelectric crystal or equivalent (2) to the location thereon, or in close proximity thereto at which the sample solution (4E) impinges, in front of said piezoelectric crystal or equivalent (2). Said KAPTON film or equivalent (3), also serves as a compressible buffer means by which the piezoelectric crystal or equivalent (2) is attached to the aerosol chamber system (16) structural heat sink (20). The aerosol chamber provides an essentially tubular structural heat sink connection means with a constriction present therein. FIG. 3 shows an expanded view of the structural heat sink (20) at its point of connection to the aerosol chamber (16). FIG. 3 also shows in exploded fashion the KAPTON film or equivalent (3), the piezoelectric crystal or equivalent (2) and an insulator (2S) which is typically, but not necessarily, made of a glass material, present on the front surface of the piezoelectric crystal or equivalent (2). The purpose of the insulator (2S) is to protect the piezoelectric crystal or equivalent against corrosion etc. due to components in sample solutions impinged thereon. Also note by reference to FIG. 3 that when the structural heat sink (20) is slid fully into the aerosol chamber (16), the KAPTON film or equivalent (3), piezoelectric crystal or equivalent (2) and insulator (2S) will be sandwiched together between the structural heat sink and the constriction in the structural heat sink connection means in the aerosol chamber. Also note that "O" ring (2R) will then serve to prevent crevasses from existing at the point of connection between the aerosol chamber (16) and the vibrational energy producing elements of the invention. Crevasses, as mentioned in the Background Section of this Disclosure, in other ultrasonic nebulizing systems have led to sample carry-over problems. It is mentioned that electrical contact to the piezoelectric crystal or equivalent (2) from the electric oscillator circuitry (15) can be by any convenient connector pathway, and is typically by way of an opening in the structural heat sink (20). Also note in FIG. 3 the indication of cool air flow (20A) over fins in the structural heat sink (20). Said fins are located distally to the point of the structural heat sink which contacts the KAPTON film or equivalent. The present invention uses air cooling and thereby avoids the complications associated with liquid cooling systems discussed in the Background Section of this Disclosure. Continuing, the compressible nature of the KAPTON film or equivalent (3) material prevents the piezoelectric crystal or equivalent (2) from repeatedly vibrating against the rigid aerosol chamber system 16) or structural heat sink (20) to which it is interfaced during operation. Said buffering prevents damage to the piezoelectric crystal or equivalent (2). Also, when the KAPTON film or equivalent (3) is in place it acts as a uniform contacting heat conducting interface between the vibrating piezoelectric crystal or equivalent (2) and the aerosol chamber system (16) or structural heat sink (20). Uniform heat removal, and piezoelectric crystal or equivalent (2) to aerosol chamber 16) and structural heat sink (20) vibrational contact buffering during use, serve to stabilize the operation of and prolong the lifetime of the piezoelectric crystal or equivalent (2) of the present invention. Typically a lifetime of years, rather than weeks (as is typically the case with piezoelectric crystals or equivalent in other ultrasonic nebulizer systems), is achieved. As mentioned above that the piezoelectric crystal or equivalent (2) of the present invention is, in the preferred embodiment, cooled by flowing air past structural heat sink (20). That is, no liquid coolant is required. As a result, corrosion problems associated with liquid cooled ultrasonic nebulizers as disclosed in the Background section of this Disclosure are eliminated.

Continuing, interaction between vibrational energy produced by said piezoelectric crystal or equivalent (2) and impinging sample solution (4E) causes production of nebulized sample solution droplets (4SD). Seventy (70%) percent of said nebulized sample solution droplets are typically of a diameter of less than thirteen (13) microns when the frequency of vibration of the piezoelectric crystal or equivalent in the present invention is one-and-three-tenths (1.3) Megahertz. Larger diameter droplets (4LD) typically fall under the influence of gravity, and are removed from the system (10) at drain (5) of aerosol chamber system (16). The remaining smaller diameter nebulized sample solution droplets (4SD are caused to flow, typically under the influence of a pressure gradient created by entering a typically tangentially directed carrier gas flow "CG" at essentially tubular carrier gas inlet port (9), into desolvation chamber (6) in which the temperature is caused to exceed the boiling point of the solvent which is present, by heater means (*6h*). The carrier gas "CG" flow rate is typically one-half (0.5) liters per minute. In said desolvation chamber (6) the nebulized sample solution droplets are desolvated to form a mixture of solvent vapor and nebulized sample particles (4SP). It is mentioned that a tangentially oriented carrier gas flow which follows a spiral-like path locus which is essentially perpendicular to the surface of the piezoelectric crystal or equivalent (2) and toward desolvation chamber (6), helps to prevent sample "carry-over" and "pulsation" problems, as discussed in prior sections of this Disclosure. It is again mentioned that no crevasses are present in the aerosol chamber which can retain sample. Continuing, the mixture of solvent vapor and nebulized sample particles (4SP) is caused to flow, typically under the influence of the pressure gradient created by entering carrier gas flow "CG", into an enclosed filter (7) of solvent removal system (8) Heater means (8h) serve to keep the temperature in the solvent removal system (8) above the boiling Point of the solvent present. Typical temperatures maintained within the solvent removal means are in the rage of forty (40) and one-hundred-and-fifty (150) degrees centigrade, depending on the solvent being used.

Enclosed filter (7) is made of a material which allows solvent vapor to diffuse therethrough, but which retains the nebulized sample particles therein. A solvent vapor removing gas flow "A" is caused to enter solvent removal system (8) at inlet port (8a), flow around the outside of enclosed filter 7), and exit at outlet port (8b). Said solvent vapor removing gas flow is indicated as "A" at the inlet port (8a) and as "A'" at the outlet port (8b). Said solvent vapor removal gas flow serves to remove solvent vapor which diffuses through said enclosed filter (7). The nebulized sample particles (4SP) which remain inside of enclosed filter (7) are then caused to flow, typically under the influence of the above identified pressure gradient, into an Inductively Coupled Plasma analysis system, or other analysis system (11) by way of connection means (11C). Said flow is identified by the numeral (4PB).

It is mentioned that enclosed filter (7) is typically made of PTFE material and is available under the tradename of GORE-TEX. Said material has a pore size of one (1) to two (2) microns and a porosity of seventy (70%) percent. Tubular forms of the filter are available with one (1), two (2) and four (4) millimeter inner diameters and are identified as GORE-TEX micro porous tubings. Said microporous tubular filters are especially suitable for use in the present invention. The GORE-TEX PTFE material has been found to provide the present invention with improved operating characteristics by allowing a relatively short length, (eg. less than forty (40) centimeters), of enclosed filter to be used, while still allowing efficient removal of solvent vapor. Enclosed filters made of other commercially available materials must typically be five (5) or more fold longer to provide equivalent solvent removal capability. A shorter length of enclosed filter means that the enclosed filter contains a smaller volume and, hence, that sample "carry-over" from one analysis procedure to a subsequent analysis procedure is greatly reduced. In addition, said enclosed filter, being of essentially linear geometry or at worst requiring only gradual curves therein to fit into reasonably sized system containments, does not present a sample transported therethrough with turbulance creating severe direction reversals. Longer enclosed filters made from inferior pore size and porosity parameter filter materials typically do include such turbulence creating sample flow path direction reversals. The result is increased sample "carry-over" based problems during use.

Also shown in FIG. 1 are desolvation chamber and solvent removal system thermocouples (13A) and (14A) respectively, and associated heating controllers (13) and (14) respectively. Said elements monitor and control of the temperatures in the associated invention system components.

Figure 2:
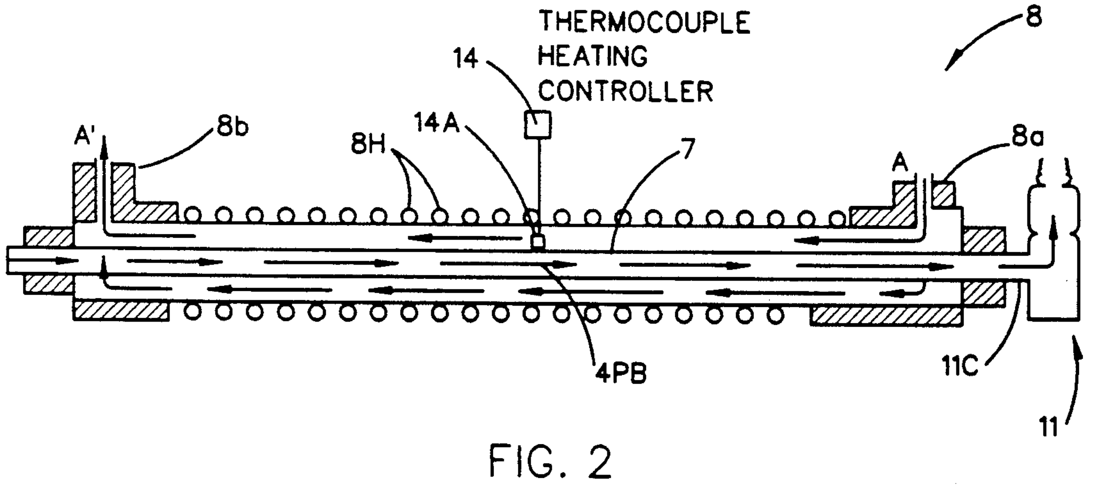
FIG. 2 shows a solvent removal system for use with the primary embodiment of the present invention in diagramatic form.

Turning now to FIG. 2, there is shown an expanded diagramatic view of a solvent removal system (8). Note in particular the inlet port (8a) at which solvent removal gas flow "A" is entered, and outlet port (8b) at which solvent vapor gas flow "A'" exits. While the solvent removal system (8) can be of any functional geometry, the preferred embodiment Is a tube of approximately one-half (0.5) inch in diameter, or less. Said shape and size provides an effective volume flow rate therethrough when a typical one (1) liter per minute solvent vapor removal gas flow "A"—"A'" is entered thereto. It is preferred to cause solvent vapor removal gas flow "A"—"A'" to flow in the direction as shown because the relative solvent saturation of the gas in solvent vapor removal gas flow "A"—"A'" along its locus of flow, is closely matched to that of the solvent vapor inside the enclosed filter (7). However, solvent vapor removal gas flow could be caused to flow in a direction opposite, eg. "A'"—"A"), to that shown and be within the scope of the present invention. Also shown in FIG. 2 are heater element (8h), nebulized sample particles flow (4PB) and connection means (12) to partially shown inductively coupled plasma or other sample analysis system (11). It is also mentioned that it is within the scope o: the present invention to utilize a chemical dessicant or a dry gas in solvent vapor removal gas flow "A"—"A'" or "A'"-—"A'.

It is also mentioned that while distinct elements are shown and described for performing various described functions in the present invention, it is within the scope of the present invention to perform more than one function in one element of the overall system of the present invention, or to combine various elements of the overall system into composite elements. For instance, desolvation chamber (6) and solvent removal system (8) might be combined into one system.

It will be appreciated, in view of the above, that the present invention provides a small internal volume enclosed filter (7) in which solvent vapor is filtered away from nebulized sample particles (4PB), the volume inside a one (1) to four (4) millimeter inner diameter GORE-TEX tube essentially comprising said enclosed filter volume. As a result, sample carry-over problems are minimized. In addition, the presently discussed embodiment of the present invention system (10), it is emphasized, does not require low temperatures to condense solvent vapor. Low temperatures can cause loss of nebulized sample particles (4PB) by way of recapture by condensing solvent vapor in systems which utilize condensers. Also, the present invention can be operated to provide high solvent removal efficiency by control of desolvation chamber (6) and solvent removal system (8) temperatures in conjunction with other system parameters, regardless of solvent type, (eg water, organic etc.). This is considered a very important point. The first embodiment of the present invention, thus, provides a sensitive, sample conserving, highly efficient system for providing highly nebulized sample particles and transporting them to a plasma or other analysis system.

Also shown in FIG. 2 are thermocouple (14A) and heating control (14).

It is also to be understood that while the desolvation chamber (6) and solvent removal system (8) are each shown as being single units in the drawings, it is possible for each to be comprised of multiple sequential units.

Figure 4:
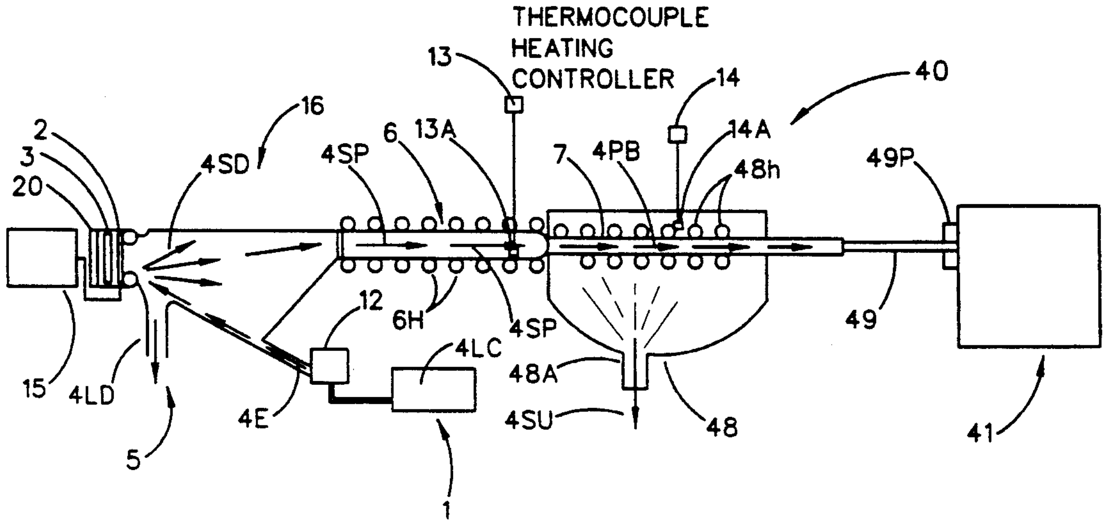
FIG. 4 shows the entire system of a modified embodiment of the present invention in diagramatic form.
Figure 5:
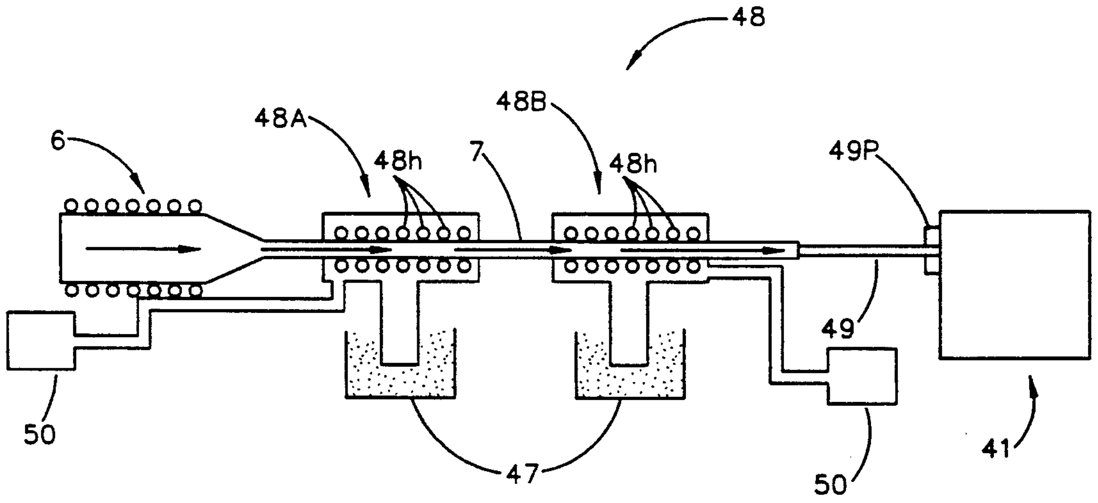
FIG. 5 shows a solvent removal system for use with the modified embodiment of the present invention in diagramatic form.

Turning now to FIG. 4, there is shown a diagramatic view of a modified embodiment of the present ultrasonic nebulizer and enclosed filter solvent removal sample introduction invention (40). The discussion relating to FIGS. 1 and 3 is equally valid to point at which the mixture of solvent vapor and desolvated sample Particles (4PB) enters the solvent removal system, except that no carrier gas (CG) is entered to the modified embodiment and inlet port (9) is not present. Note that FIG. 4, however, does show a low temperature condenser solvent removal system (40) with an enclosed filter (7) therethrough, and with heating elements (48H) present around the enclosed filter (7). Entering solvent vapor is maintained at a temperature above the boiling point of the solvent as it is transported through the enclosed filter, by said heating elements (48H), to the point along the enclosed filter at which it diffuses through the enclosed filter and into a low temperature condenser (48), in which the solvent vapor condenses and flows out of drain (48A), said flow being indicated by (4SU). Entering nebulized desolvated sample particles (4PB) are transported toward an analysis system 41) by way of connection means (49) from the solvent removal system, and connection means (49P) at the analysis system 41). Analysis system (41) is typically, when this modified embodiment of the present invention is used, a mass spectrometer which operates at a very low internal pressure, (eg. ten-to-the-minus-fifth Torr). At connection means (49P) the pressure is typically approximately one (1) Torr. The pressure at the aerosol chamber (16) is typically 500 torr or greater. The driving force for the sample transport through the ultrasonic nebulization and enclosed filter sample preparation system (40) is thus identified. Turning now to FIG. 5, there is shown an expanded exemplary diagramatic view of the solvent removal system 48) in FIG. 4. Note that two sections (48A) and (4BB) are shown. This is shown as an example only, and it is within the scope of the present invention to provide a solvent removal system with more or less than two sections, just as other elements of the present invention can be of other than exactly shown functional construction. Also shown in FIG. 5 are optional vacuum pumps (50) and low temperature maintaining liquid, typically liquid nitrogen or a mixture of dry ice and isopropanol (47). It is specifically noted that the modified embodiment of the present invention shown in FIGS. 4 and 5, can be termed a Universal Particle Beam Interface for use in interconnecting liquid chromatography and mass spectrometer systems. Connection means (49) can be a one-sixteenth (1/16) inch diameter tube, which will easily attach to most mass spectrometer systems without modification thereto.

It is also to be understood that the desolvation and solvent removal systems of the primary and modified embodiments of the present invention can be, in certain rare cases where desolvation of sample solution droplets is not desired, eliminated. The overall systems of FIGS. 1 and 4 depict such an additional embodiment of the present invention when the desolvation and solvent removal systems are visualized as inactive sample outlet means which can be connected to sample analysis systems (11) and (41). This would essentially be the case were the desolvation and solvent removal systems not operated during a sample preparation procedure.

It is to be understood that while inductively coupled plasma and mass spectrometers were used as examples herein, any gas phase or particle sample analysis system is to be considered equivalent for the purpose of claim interpretation.

It is also to be understood that sample solutions can originate from any source and can be subjected to component separation steps prior to being entered into a system for introducing samples as sample flows. This might be the case, for instance, where the sample solution is derived from a liquid chromatography source.

In addition, it is to be understood that the language in this Specification repeatably identifies vibrational energy reflecting element (3) as a KAPTON film or equivalent, and the vibrational energy producing element (2) as a piezoelectric crystal or equivalent. The KAPTON film is also identified as preferably being a polyimide film.

Having hereby disclosed the subject matter of this invention, it should be obvious that many modifications, substitutions, and variations of the present invention are possible in light of the teachings. It is therefore to be understood that the invention may be practiced other than as specifically described, and should be limited in breadth and scope only by the claims.

We claim:

1. A sample introduction system for introducing samples into sample analysis systems which comprises:

a. an aerosol chamber;

b. a piezoelectric crystal;

c. a polyimide film;

d. a structural heat sink;

e. a sample outlet means;

which aerosol chamber comprises a means for allowing entry of a sample solution flow; means for connecting to the structural heat sink at one extent thereof and means for connecting to the sample outlet means at another extent thereof; which means for connecting to the structural heat sink is essentially tubular in shape with a constriction therein at some distance therealong; which polyimide film serves as an interface between the structural heat sink and the piezoelectric crystal; which structural heat sink with polyimide film and piezoelectric crystal on one extent thereof is connected to the aerosol chamber at the means for connection to said structural heat sink therein so that the piezoelectric crystal is sandwiched between the structural heat sink, polyimide film and the constriction in the aerosol chamber, means for connecting to the structural heat sink so that no sample retaining crevasses are present at the point of connection; which piezoelectric crystal is, during use, caused to vibrate by application of electrical energy through an oscillator circuit of which it is an element; which piezoelectric crystal is buffered in its contact with the structural heat sink as it vibrates, by the polyimide film and which polyimide film also serves to reflect and focus vibrational energy produced to a position at which it can be better utilized in nebulizing sample solution; which structural heat sink, at an extent thereof distal to that at which the polyimide film and piezoelectric crystal are present, has present fins, which fins are subjected to a flow of cooling air during use, which cooling air serves to maintain the piezoelectric crystal at a desired temperature by way of heat conduction along the structural heat sink; through which means for allowing entry of a sample solution flow in the aerosol chamber a sample solution flow is entered during use; such that during use the entering sample solution flow is impinged in close proximity to the vibrating piezoelectric crystal whereat said sample solution is nebulized to form sample solution droplets by interaction with the vibrational energy produced by the vibrating piezoelectric crystal; which nebulized sample solution droplets can be transported into the sample outlet means to which the aerosol chamber is connected at the means for connection to the sample outlet means.

2. A sample introduction system as in claim 1, in which the piezoelectric crystal vibrates at one-and-three-tenths (3.1) megahertz.

3. A sample introduction system as in claim 1, which further comprises a nebulized sample solution droplet desolvation system connected to the sample outlet means at one extent of said sample solution droplet desolvation system, and an enclosed filter solvent removal system connected to the nebulized sample solution droplet desolvation system at an opposite extent thereof; to which nebulized sample solution droplet desolvation sysem and enclosed filter solvent removal system nebulized sample solution droplets can be entered during use; which nebulized sample solution droplet desolvation system serves to vaporize solvent and which enclosed filter solvent removal system serves to remove said vaporized solvent which diffuses through the enclosed filter, to provide nebulized sample particles inside the enclosed filter which can be transported into a sample analysis system for analysis by a detector therein.

4. A sample introduction system as in claim 3, in which the solvent removal system utilizes a flow of gas outside the enclosed filter to remove solvent vapor which diffuses through the enclosed filter.

5. A sample introduction system as in claim 3, in which the solvent removal system utilizes a low temperature condenser to condense and remove solvent vapor which diffuses through the enclosed filter.

6. A sample introduction system as in claim 1, which further comprises an insulator between the piezoelectric crystal and the constriction in the means for connection to the structural heat sink in the aerosol chamber.

7. An sample introduction system for introducing samples into sample analysis systems which comprises:

a. an aerosol chamber;
b. a piezoelectric crystal;
c. a polyimide film;
d. a structural heat sink;
e. a desolvation system; and
f. a solvent removal system which aerosol chamber comprises a means for allowing entry of a sample solution flow; means for allowing entry of a carrier gas flow; means for connection to the structural heat sink at one extent thereof and means for connection to the desolvation system at another extent thereof; which means for connecting to the structural heat sink is essentially tubular in shape with a constriction therein at some distance therealong; which polyimide film serves as an interface between the structural heat sink and the piezoelectric crystal; which structural heat sink with polyimide film and piezoelectric crystal on one extent thereof is connected to the aerosol chamber at the means for connecting to said structural heat sink therein so that the piezoelectric crystal is sandwiched between the structural heat sink, polyimide film and the constriction in the aerosol chamber, means for connection to the structural heat sink so that no sample retaining crevasses are present at the point of connection; which piezoelectric crystal is, during use, caused to vibrate by application of electrical energy through an oscillator circuit of which it is an element; which piezoelectric crystal is buffered in its contact with the structural heat sink as it vibrates, by the polyimide film and which polyimide film also serves to reflect and focus vibrational energy produced to a position at which it can be better utilized in nebulizing sample solution; which structural heat sink, at an extent thereof distal tot hat at which the polyimide film and piezoelectric crystal are present, has present fins, which fins are subjected to a flow of cooling air during use, which cooling air serves to maintain the piezoelectric crystal at a desired temperature by way of heat conduction along the structural heat sink; through which means for allowing entry of a sample solution flow in the aerosol chamber a sample solution flow is entered during use; through which means for allowing entry of a carrier gas flow in the aerosol chamber a tangentially oriented carrier gas flow is entered during use; with tangential taken to means that the carrier gas flow follows a spiral-like path through the aerosol chamber essentially perpendicular to the surface of the piezoelectric crystal; such that during use the entering sample solution flow is impinged in close proximity to the vibrating piezoelectric crystal whereat said sample solution is nebulized to form sample solution droplets by interaction with the vibrational energy produced by the vibrating piezoelectric crystal; which nebulized sample solution droplets are transported under the influence of a pressure gradient created by entry of the tangentially entered carrier gas flow through the aerosol chamber and into the desolvation system to which the aerosol chamber is connected at the means for connection to the desolvation system, in which desolvation chamber the nebulized sample solution droplets are heated, by heating elements present therein, to a temperature above the boiling point of solvent in the sample solution so that said solvent vaporizes, thereby forming a mixture of nebulized sample particles and solvent vapor; which mixture of nebulized sample particles and solvent vapor is transported under the influence of the pressure gradient created by entry of the tangentially entered carrier gas flow, into an enclosed filter in the solvent removal system; to which solvent removal system the desolvation system is connected; which enclosed filter is made of a material which allows solvent vapor to diffuse therethrough but which retains nebulized sample particles therein; which solvent vapor diffuses through said enclosed filter and is swept away by a gas flow outside the enclosed filter; and which nebulized sample particles are further transported to a sample analysis system.

8. A sample introduction system as in claim 6, in which the enclosed filter int he solvent removal system is essentially without turbulence creating severe sample flow path direction changing aspects.

9. A sample introduction system as in claim 7, in which the piezoelectric crystal vibrates at one-and-three-tenths (1.3) megahertz.

10. A sample introduction system as in claim 7, in which the enclosed filter is made from polytetrafloroethylene (PTFE) tubing with an inner diameter of four (4) milimeters or less, a porosity of seventy (70%) percent and port size of one (1) to two (2) microns.

11. A sample introduction system as in claim 7, which further comprises heating elements along the length of the enclosed filter, and in which the enclosed filter is maintained at a temperature of between 40 and 150 degrees centrigrade.

12. A sample introduction system as in claim 7, which further comprises a drain in the aerosol chamber system, for use in removal of a relatively few large diameter droplets formed in the nebulized sample solution droplet forming nebulization process.

13. A sample introduction system as in claim 7, which further comprises temperature monitoring and controlling means in the desolvation and solvent removal systems in addition to simple heating element control.

14. A sample introduction system as in claim 7, which further comprises an insulator between the piezoelectric crystal and the constriction in the means for connection to the structural heat sink in the aerosol chamber.

15. An sample introduction system for introducing samples into sample analysis systems which comprises:

a. an aerosol chamber;

b. a piezoelectric crystal;

c. a polyimide film;

d. a structural heat sink;

e. a desolvation system; and f. a solvent removal system which aerosol chamber comprises a means for allowing entry of a sample solution flow; means for connecting to the structural heat sink at one extent thereof and means for connecting to the desolvation system at another extent thereof; which means for connecting to the structural heat sink is essentially tubular in shape with a constriction therein at some distance therealong; which polyimide film serves as an interface between the structural heat sink and the piezoelectric crystal; which structural heat sink with polyimide film and piezoelectric crystal on one extent thereof is connected to the aerosol chamber at the means for connecting to said structural heat sink therein so that the piezoelectric crystal is sandwiched between the structural heat sink, polyimide film and the constriction in the aerosol chamber, means for connection to the structural heat sink so that no sample retaining crevasses are present at the point of connection; which piezoelectric crystal is, during use, caused to vibrate by application of electrical energy through an oscillator circuit of which it is an element; which piezoelectric crystal is buffered in its contact with the structural heat sink as it vibrates, by the polyimide film and which polyimide film also serves to reflect and focus vibrational energy produced to a position at which it can be better utilized in nebulizing sample solution; which structural heat sink, at an extent thereof distal to that at which the polyimide film and piezoelectric crystal are present, has present fins, which fins are subjected to a flow of cooling air during use, which cooling air serves to maintain the piezoelectric crystal at a desired temperature by way of heat conduction along the structural heat sink; through which means for allowing entry of a sample solution flow in the aerosol chamber a sample solution flow is entered during use; such that during use the entering sample solution flow is impinged in close proximity to the vibrating piezoelectric crystal whereat said sample solution is nebulized to form sample solution droplets by interaction with the vibrational energy produced by the vibrating piezoelectric crystal; which nebulized sample solution droplets are transported into the desolvation system to which the aerosol chamber is connected at the means for connection to the desolvation system, in which desolvation chamber the nebulized sample solution droplets are heated, by heating elements present therein, to a temperature above the boiling point of solvent in the sample solution so that said solvent vaporizes, thereby forming a mixture of nebulized sample particles and solvent vapor; which mixture of nebulized sample particles and solvent vapor is transported into an enclosed filter in the solvent removal system; to which solvent removal system the desolvation system is connected; which enclosed filter is made of a material which allows solvent vapor to diffuse therethrough but which retains nebulized sample particles therein; which solvent vapor diffuses through said enclosed filter and is condensed and removed by application of a low temperature in the solvent removal system; and which nebulized sample particles are further transported to the input port of a sample analysis system for analysis therein; the transport of which nebulized sample solution droplets and nebulized sample particles through the desolvation and solvent removal systems to the sample analysis system is effected by a pressure gradient created by application of a pressure at the sample analysis system which is below the pressure present in the aerosol chamber.

16. A sample introduction system as in claim 15, in which the enclosed filter in the solvent removal system is essentially without turbulence creating severe sample flow path direction changing aspects.

17. A sample introduction system as in claim 15, in which the piezoelectric crystal vibrates at one-and-three-tenths (1.3)

18. A sample introduction system as in claim 15, in which the enclosed filter is made from polytetrafloroethylene (PTFE) tubing with an inner diameter of four (4) milimeters or less, a porosity of seventy (70%) percent and pore size of one (1) to two (2) microns.

19. A sample introduction system as in claim 15, which further comprises heating elements along the length of the enclosed filter, and in which the enclosed filter is maintained at a temperature of between 40 and 150 degrees centrigrade.

20. A sample introduction system as in claim 15, which further comprises a drain in the aerosol chamber system, for use in removal of a relatively few large diameter droplets formed in the nebulized sample solution droplet forming nebulization process.

21. A sample introduction system as in claim 15, which further comprises temperature monitoring and controlling means in the desolvation and solvent removal systems in addition to simple heating element control.

22. A sample introduction system as in claim 15, which further comprises an insulator between the piezoelectric crystal and the constriction in the means for connection to the structural heat sink in the aerosol chamber.

23. A method of introducing samples to a sample analysis system for analysis comprising the steps of:

A. obtaining a sample introduction system for introducing samples into sample analysis systems which comprises:

a. an aerosol chamber;

b. a piezoelectric crystal;

c. a polyimide film;

d. a structural heat sink;

e. a sample outlet means;

which aerosol chamber comprises a means for allowing entry of a sample solution flow; means for connecting to the structural heat sink at one extent thereof and means for connecting to the sample outlet means at another extent thereof; which means for connecting to the structural heat sink is essentially tubular in shape with a constriction therein at some distance therealong; which polyimide film serves as an interface between the structural heat sink and the piezoelectric crystal; which structural heat sink with polyimide film and piezoelectric crystal on one extent thereof is connected to the aerosol chamber at the means for connecting to said structural heat sink therein so that the piezoelectric crystal is sandwiched between the structural heat sink, polyimide film and the constriction in the aerosol chamber, means for connecting to the structural heat sink so that no sample retaining crevasses are present at the point of connection; which piezoelectric crystal is, during use, caused to vibrate by application of electrical energy through an oscillator circuit of which it is an element; which piezoelectric crystal is buffered in its contact with the structural heat sink as it vibrates, by the polyimide film and which polyimide film also serves to reflect and focus vibrational energy produced to a position at which it can be better utilized in nebulizing sample solution; which structural heat sink, at an extent thereof distal to that at which the polyimide film and piezoelectric crystal are present, has present fins, which fins are subjected to a flow of cooling air during use, which cooling air serves to maintain the piezoelectric crystal at a desired temperature by way of heat conduction along the structural heat sink; through which means for allowing entry of a sample solution flow in the aerosol chamber a sample solution flow is entered during use; such that during use the entering sample solution flow is impinged in close proximity to the vibrating piezoelectric crystal whereat said sample solution is nebulized to form sample solution droplets by interaction with the vibrational energy produced by the vibrating piezoelectric crystal; which nebulized sample solution droplets can be transported into the sample outlet means to which the aerosol chamber is connected at the means for connection to the sample outlet means;

B. providing a flow of cool air to the fins of the structural heat sink;

C. causing the piezoelectric crystal to vibrate;

D. entering a flow of sample solution;

E. transporting the resulting nebulized sample solution droplets to an inlet port of a sample analysis system for analysis by a detector therein, by way of the sample outlet means.

24. A method of introducing samples as in claim 23, in which the sample solution is subjected to a component separation step prior to entry as a flow into the system for introducing samples.

25. A method of introducing samples as in claim 23, which further comprises the step of desolvating the nebulized sample solution droplets as they are transported to the inlet port of a sample analysis system.

26. A method of introducing samples to a sample analysis system for analysis comprising the steps of:

A. obtaining a sample introduction system for introducing samples into sample analysis systems which comprises:

a. an aerosol chamber;

b. a piezoelectric crystal;

c. a polyimide film;

d. a structural heat sink;

e. a desolvation system; and f. a solvent removal system which aerosol chamber comprises a means for allowing entry of a sample solution flow; means for allowing entry of a carrier gas flow; means for connection to the structural heat sink at one extent thereof and means for connection to the desolvation system at another extent thereof; which means for connecting to the structural heat sink is essentially tubular in shape with a constriction therein at some distance therealong; which polyimide film serves as an interface between the structural heat sink and the piezoelectric crystal; which structural heat sink with polyimide film and piezoelectric crystal on one extent thereof is connected to the aerosol chamber at the means for connecting to said structural heat sink therein so that the piezoelectric crystal is sandwiched between the structural heat sink, polyimide film and the constriction in the aerosol chamber, means for connection to the structural heat sink so that no sample retaining crevasses are present at the point of connection; which piezoelectric crystal is, during use, caused to vibrate by application of electrical energy through an oscillator circuit of which it is an element; which piezoelectric crystal is buffered in its contact with the structural heat sink as it vibrates, by the polyimide film and which polyimide film also serves to reflect and focus vibrational energy produced to a position at which it can be better utilized in nebulizing sample solution; which structural heat sink, at an extent thereof distal to that at which the polyimide film and piezoelectric crystal are present, has present fins, which fins are subjected to a flow of cooling air during use, which cooling air serves to maintain the piezoelectric crystal at a desired temperature by way of heat conduction along the structural heat sink; through which means for allowing entry of a sample solution flow in the aerosol chamber a sample solution flow is entered during use; through which means for allowing entry of a carrier gas flow in the aerosol chamber a tangentially oriented carrier gas flow is entered during use; with tangential taken to means that the carrier gas flow follows a spiral-like path through the aerosol chamber essentially perpendicular to the surface of the piezoelectric crystal; such that during use the entering sample solution flow is impinged in close proximity to the vibrating piezoelectric crystal whereat said sample solution is nebulized to form sample solution droplets by interaction with the vibrational energy produced by the vibrating piezoelectric crystal; which nebulized sample solution droplets are transported under the influence of a pressure gradient created by entry of the tangentially entered carrier gas flow through the aerosol chamber and into the desolvation system to which the aerosol chamber is connected at the means for connection to the desolvation system, in which desolvation chamber the nebulized sample solution droplets are heated, by heating elements present therein, to a temperature above the boiling point of solvent in the sample solution so that said solvent vaporizes, thereby forming a mixture of nebulized sample particles and solvent vapor; which mixture of nebulized sample particles and solvent vapor is transported under the influence of the pressure gradient created by entry of the tangentially entered carrier gas flow, into an enclosed filter in the solvent removal system; to which solvent removal system the desolvation system is connected; which enclosed filter is made of a material which allows solvent vapor to diffuse therethrough but which retains nebulized sample particles therein; which solvent vapor diffuses through said enclosed filter and is swept away by a gas flow outside the enclosed filter; and which nebulized sample particles are further transported to a sample analysis system;

B. providing a flow of cooling air to the fins of the structural heat sink;

C. causing the piezoelectric crystal to vibrate;

D. entering a flow of sample solution;

E. entering a flow of tangentially directed carrier gas;

F. heating the desolvation system and enclosed filter in the solvent removal system to a temperature above the boiling point of the sample solvent by means of the heating elements therein;

G. providing a flow of solvent vapor removing gas outside the enclosed filter; and H. transporting the resulting nebulized sample particles to an input port of a sample analysis system for analysis by a detector therein.

27. A method of introducing samples as in claim 26, in which the sample solution is subjected to a component separation step prior to entry as a flow into the system for introducing samples.

28. A method of introducing samples to a sample analysis system for analysis comprising the steps of:

A. obtaining a sample introduction system for introducing samples into sample analysis systems which comprises:

a. an aerosol chamber;

b. a piezoelectric crystal;

c. a polyimide film;

d. a structural heat sink;

e. a desolvation system; and f. a solvent removal system which aerosol chamber comprises a means for allowing entry of a sample solution flow; means for connecting to the structural heat sink at one extent thereof and means for connecting to the sample outlet means at another extent thereof; which means for connecting to the structural heat sink is essentially tubular in shape with a constriction therein at some distance therealong; which polyimide film serves as an interface between the structural heat sink and the piezoelectric crystal; which structural heat sink with polyimide film and piezoelectric crystal on one extent thereof is connected to the aerosol chamber at the means for connecting to said structural heat sink therein so that the piezoelectric crystal is sandwiched between the structural heat sink, polyimide film and the constriction in the aerosol chamber, means for connecting to the structural heat sink so that no sample retaining crevasses are present at the point of connection; which piezoelectric crystal is, during use, caused to vibrate by application of electrical energy through an oscillator circuit of which it is an element; which piezoelectric crystal is buffered in its contact with the structural heat sink as it vibrates, by the polyimide film and which polyimide film also serves to reflect and focus vibrational energy produced to a position at which it can be better utilized in nebulizing sample solution; which structural heat sink, at an extent thereof distal to that at which the polyimide film and piezoelectric crystal are present, has present fins, which fins are subjected to a flow of cooling air during use, which cooling air serves to maintain the piezoelectric crystal at a desired temperature by way of heat conduction along the structural heat sink; through which means for allowing entry of a sample solution flow in the aerosol chamber a sample solution flow is entered during use; such that during use the entering sample solution flow is impinged in close proximity to the vibrating piezoelectric crystal whereat said sample solution is nebulized to form sample solution droplets by interaction with the vibrational energy produced by the vibrating piezoelectric crystal; which nebulized sample solution droplets are transported into the sample outlet means to which the aerosol chamber is connected at the means for connection to the desolvation system, in which desolvation chamber the nebulized sample solution droplets are heated, by heating elements present therein, to a temperature above the boiling point of solvent in the sample solution so that said solvent vaporizes, thereby forming a mixture of nebulized sample particles and solvent vapor; which mixture of nebulized sample particles and solvent vapor is transported into an enclosed filter in the solvent removal system; to which solvent removal system the desolvation system is connected; which enclosed filter is made of a material which allows solvent vapor to diffuse therethrough but which retains nebulized sample particles therein; which solvent vapor diffuses through said enclosed filter and is condensed and removed by application of a low temperature in the solvent removal system; and which nebulized sample particles are further transported to the input port of a sample analysis system for analysis therein; the transport of which nebulized sample solution droplets and nebulized sample particles through the desolvation and solvent removal systems to the sample analysis system is effected by a pressure gradient created by application of a pressure at the sample analysis system which is below the pressure present in the aerosol chamber;

B. providing a flow of cooling air to the fins of the structural heat sink;

C. causing the piezoelectric crystal to vibrate;

D. entering a flow of sample solution;

E. cooling the solvent removal system to a temperature below the condensation point of the sample solvent;

F. heating the desolvation system and enclosed filter in the solvent removal system to a temperature above the boiling point of the sample solvent;

G. providing a pressure at the sample analysis system which is below that in the aerosol chamber; and H. transporting the resulting nebulized sample particles to an input port of a sample analysis system for analysis by a detector therein.

29. A method of introducing samples as in claim 28, in which the sample solution is subjected to a component separation step prior to entry as a flow into the system for introducing samples.

30. A sample introduction system which comprises:

a. an aerosol chamber;

b. a piezoelectric crystal;

c. a polyimide film;

d. a structural heat sink;

e. a sample outlet means;

f. a desolvation chamber;

g. a solvent removal system;

which aerosol chamber comprises a means for allowing entry of a sample solution flow and means for connecting to the structural heat sink at one extent thereof; and a sample outlet means at another extent thereof; which means for connecting to the structural heat sink is essentially tubular in shape with a constriction therein at some distance therealong; which structural heat sink, on one extent thereof is connected to the aerosol chamber, at the means for connection to said structural heat sink therein so that the piezoelectric crystal is sandwiched between the structural heat sink, polyimide film and the constriction in the aerosol chamber, means for connecting to the structural heat sink, with said polyimide film being adjacent to said structural heat sink, such that no sample retaining crevasses are present at the point of connection; which piezoelectric crystal is, during use, caused to vibrate by application of electrical energy through an oscillator circuit of which it is an element; which structural heat sink, at an extent thereof distal to that at which it is connected to the aerosol chamber, has present fins, which fins are subjected to a flow of cooling air during use, which cooling air serves to maintain the piezoelectric crystal at a desired temperature by way of heat conduction along the structural heat sink; through which means for allowing entry of a sample solution flow in the aerosol chamber a sample solution flow is entered during use; such that during use the entering sample solution flow is impinged in close proximity to the vibrating piezoelectric crystal whereat said sample solution is nebulized to form sample solution droplets by interaction with the vibrational energy produced by the vibrating piezoelectric crystal; which nebulized sample solution droplets can be transported into the sample outlet means.

31. A sample introduction system as in claim 30, in which the piezoelectric crystal vibrates at one-and-three-tenths (1.3) megahertz.

32. A sample introduction system as in claim 30 which further comprises a mass spectrometer, which mass spectrometer is attached, directly or indirectly, to said sample outlet means, and which nebulized sample solution droplets are caused to be transported into said mass spectrometer by the presence of a lower pressure in said mass spectrometer and any intermediary elements between said sample outlet means and said mass spectrometer, than is present in the aerosol chamber, without the use of any entered carrier gas flows.

33. A sample introduction system as in claim 30 in which the desolvation chamber is connected at the sample outlet means of the aerosol chamber, and in which the nebulized sample solution droplets are heated to a temperature above the vaporization point of solvent in the sample solution so that said solvent vaporizes, thereby forming a mixture of desolvated nebulized sample particles and solvent vapor; which mixture of desolvated nebulized sample particles and solvent vapor is transported under the influence of a pressure gradient, into an enclosed filter in the solvent removal system; to which solvent removal system the desolvation chamber is connected; which enclosed filter is made of a material which allows solvent vapor to diffuse therethrough but which retains desolvated nebulized sample particles therein; which solvent vapor diffuses through said enclosed filter and is removed; and which desolvated nebulized sample particles are further transported to a sample analysis system.

34. A sample introduction system as in claim 33, in which the solvent vapor which diffuses through the enclosed filter is removed by a low temperature condensor.

35. A sample introduction system as in claim 33, in which the solvent vapor which diffuses through the enclosed filter is removed by a flow of gas outside the enclosed filter.

36. A sample introduction system as in claim 33, in which the enclosed filter in the solvent removal system is essentially without turbulence creating severe sample flow path direction changing aspects.

37. A sample introduction system as in claim 33, in which the piezoelectric crystal vibrates at one-and-three-tenths (1.3) megahertz.

38. A sample introduction system as in claim 33, in which the enclosed filter is made from polytetrafloroethylene (PTFE) tubing.

39. A sample introduction system as in claim 38, in which the PTFE tubing has an inner diameter of four (4) milimeters or less, a porosity of seventy (70%) percent and pore size of two (2) microns or less.

40. A sample introduction system as in claim 33, which further comprises heating elements along the length of the enclosed filter, and in which the enclosed filter is maintained at a temperature of between forty (40) and one-hundred-fifty (150) degrees centigrade during use.

41. A sample introduction system as in claim 33, which further comprises a drain in the aerosol chamber system, for use in removal of a relatively few large diameter droplets formed in the nebulized sample solution droplet forming nebulization process.

42. A sample introduction system as in claim 33, which further comprises temperature monitoring and controlling means in the desolvation and solvent removal systems.

43. A sample introduction system as in claim 30, in which the aerosol chamber further comprises a means for entering a gas flow and in which the nebulized sample solution droplets are caused to be transported into the sample outlet means by a pressure gradient which is created at least partially by the entry of a flow of gas into the aerosol chamber.

44. A sample introduction system as in claim 30, in which the nebulized sample solution droplets are caused to be transported into the sample outlet means by a pressure gradient which is created solely by application of a lower pressure at the sample outlet means than is present in the aerosol chamber.

45. A sample introduction system for introducing samples into sample analysis systems which comprises:

a. an aerosol chamber;

b. a vibrational energy production element;

c. a vibrational energy reflecting element;

d. a structural heat sink;

e. a sample outlet means;

which aerosol chamber comprises a means for allowing entry of a sample solution flow; means for connecting to the structural heat sink at one extent thereof and means for connecting to the sample outlet means at another extent thereof; which means for connecting to the structural heat sink is essentially tubular in shape with a constriction therein at some distance therealong; which vibrational energy reflecting element serves as an interface between the structural heat sink and the vibrational energy production element; which structural heat sink with vibrational energy reflecting element and vibrational energy production element on one extent thereof is connected to the aerosol chamber at the means for connection to said structural heat sink therein so that the vibrational energy production element is sandwiched between the structural heat sink, vibrational energy reflecting element and the constriction in the aerosol chamber, means for connecting to the structural heat sink so that no sample retaining crevasses are present at the point of connection; which vibrational energy production element is, during use, caused to vibrate; which vibrational energy production element is buffered in its contact with the structural heat sink as it vibrates, by the vibrational energy reflecting element and which vibrational energy reflecting element also serves to reflect and focus vibrational energy produced to a position at which it can be better utilized in nebulizing sample solution; which structural heat sink, at an extent thereof distal to that at which the vibrational energy reflecting element and vibrational energy production element are present, has present fins, which fins are subjected to a flow of cooling air during use, which cooling air serves to maintain the vibrational energy production element at a desired temperature by way of heat conduction along the structural heat sink; through which means for allowing entry of a sample solution flow in the aerosol chamber a sample solution flow is entered during use; such that during use the entering sample solution flow is impinged in close proximity to the vibrating vibrational energy production element whereat said sample solution is nebulized to form sample solution droplets by interaction with the vibrational energy produced by the vibrating vibrational energy production element; which nebulized sample solution droplets can be transported into the sample outlet means to which the aerosol chamber is connected at the means for connection to the sample outlet means.

46. A sample introduction system as in claim 45, in which the vibrational energy production element vibrates at one-and-three-tenths (1.3) megahertz.

47. A sample introduction system as in claim 45, which further comprises a nebulized sample solution droplet desolvation system connected tot he sample outlet means at one extent of said sample solution droplet desolvation system, and an enclosed filter solvent removal system connected tot he nebulized sample solution droplet desolvation system at an opposite extent thereof; to which nebulized sample solution droplet desolvation system and enclosed filter solvent removal system nebulized sample solution droplets can be entered during use; which nebulized sample solution droplet desolvation system serves to vaporize solvent and which enclosed filter solvent removal system serves to remove said vaporized solvent which diffuses through the enclosed filter, to provide nebulized sample particles inside the enclosed filter which can be transported into a sample analysis system for analysis by a detector therein.

48. A sample introduction system as in claim 45, in which the solvent removal system utilizes a flow of gas outside the enclosed filter to remove solvent vapor which diffuses through the enclosed filter.

49. A sample introduction system as in claim 45, in which the solvent removal system utilizes a low temperature condenser to condense and remove solvent vapor which diffuses through the enclosed filter.

50. An sample introduction system for introducing samples into sample analysis systems which comprises:

a. an aerosol chamber;

b. a vibrational energy production element;

c. a vibrational energy reflecting element;

d. a structural heat sink;

e. a desolvation system; and f. a solvent removal system which aerosol chamber comprises a means for allowing entry of a sample solution flow; means for allowing entry of a carrier gas flow; means for connecting to the structural heat sink at one extent thereof and means for connection to the desolvation system at another extent thereof; which means for connecting to the structural heat sink is essentially tubular in shape with a constriction therein at some distance therealong; which vibrational energy reflecting element serves as an interface between the structural heat sink and the vibrational energy production element; which structural heat sink with vibrational energy reflecting element and vibrational energy production element on one extent thereof is connected to the aerosol chamber at the means for connecting to said structural heat sink therein so that the vibrational energy production element is sandwiched between the structural heat sink, vibrational energy reflecting element and the constriction in the aerosol chamber, means for connecting to the structural heat sink so that no sample retaining crevasses are present at the point of connection; which vibrational energy production element is, during use, caused to vibrate by application of energy; which vibrational energy production element is buffered in its contact with the structural heat sink as it vibrates, by the vibrational energy reflecting element and which vibrational energy reflecting element also serves to reflect and focus vibrational energy produced to a position at which it can be better utilized in nebulizing sample solution; which structural heat sink, at an extent thereof distal to that at which the vibrational energy reflecting means and vibrational energy production means are present, has present fins, which fins are subjected to a flow of cooling air during use, which cooling air serves to maintain the vibrational energy production element at a desired temperature by way of heat conduction along the structural heat sink; through which means for allowing entry of a sample solution flow in the aerosol chamber a sample solution is entered during use; through which means for allowing entry of a carrier gas flow in the aerosol chamber a tangentially oriented carrier gas flow is entered during use; with tangential taken to mean that the carrier gas flow follows a spiral-like path through the aerosol chamber essentially perpendicular to the surface of the vibrational energy production element; such that during use the entering sample solution flow is impinged in close proximity to the vibrating vibrational energy production element whereat said sample solution is nebulized to form sample solution droplets by interaction with the vibrational energy produced by the vibrating vibrational energy production element; which nebulized sample solution droplets and transported under the influence of a pressure gradient created by entry of the tangentially entered carrier gas flow through the aerosol chamber and into the desolvation system to which the aerosol chamber is connected at the means for connection tot he desolvation system, in which desolvation chamber the nebulized sample solution droplets are heated, by heating elements present therein, to a temperature above the boiling point of solvent in the sample solution so that said solvent vaporizes, thereby forming a mixture of nebulized sample particles and solvent vapor; which mixture of nebulized sample particles and solvent vapor is transported under the influence of the pressure gradient created by entry of the tangentially entered carrier gas flow, into an enclosed filter in the solvent removal system; to which solvent removal system the desolvation system is connected; which enclosed filter is made of a material which allows solvent vapor to diffuse therethrough but which retains nebulized sample particles therein; which solvent vapor diffuses through said enclosed filter and is swept away by a gas flow outside the enclosed filter; and which nebulized sample particles are further transported to a sample analysis system.

51. An sample introduction system for introducing samples into sample analysis systems which comprises:

a. an aerosol chamber;

b. a vibrational energy production element;

c. a vibrational energy reflecting element;

d. a structural heat sink;

e. a desolvation system; and f. a solvent removal system which aerosol chamber comprises a means for allowing entry of a sample solution flow; means for connecting to the structural heat sink at one extent thereof and means for connecting to the desolvation system at another extent thereof; which means for connecting to the structural heat sink is essentially tubular in shape with a constriction therein at some distance therealong; which vibrational energy reflecting element serves as an interface between the structural heat sink and the vibrational energy production element; which structural heat sink with vibrational energy reflecting element and vibrational energy production element on one extent thereof is connected to the aerosol chamber at the means for connection to said structural heat sink therein so that the vibrational energy production element is sandwiched between the structural heat sink, vibrational energy reflecting element and the constriction in the aerosol chamber, means for connecting to the structural heat sink so that no sample retaining crevasses are present at the point of connection; which vibrational energy production element is, during use, caused to vibrate by application of energy; which vibrational energy production element is buffered in its contact with the structural heat sink as it vibrates, by the vibrational energy reflecting element and which vibrational energy reflecting element also serves to reflect and focus vibrational energy produced to a position at which it can be better utilized in nebulizing sample solution; which structural heat sink, at an extent thereof distal to that at which the vibrational energy reflecting element and vibrational energy production element are present, has present fins, which fins are subjected to a flow of cooling air during use, which cooling air serves to maintain the vibrational energy production element at a desired temperature by way of heat conduction along the structural heat sink; through which means for allowing entry of a sample solution flow in the aerosol chamber a sample solution flow is entered during use; such that during use the entering sample solution flow is impinged in close proximity to the vibrating vibrational energy production element whereat said sample solution is nebulized to form sample solution droplets by interaction with the vibrational energy produced by the vibrating vibrational energy production element; which nebulized sample solution droplets are transported into the desolvation system to which the aerosol chamber is connected at the means for connection to the desolvation system, in which desolvation chamber the nebulized sample solution droplets are heated, by heating elements present therein, to a temperature above the boiling point of solvent in the sample solution so that said solvent vaporizes, thereby forming a mixture of nebulized sample particles and solvent vapor; which mixture of nebulized sample particles and solvent vapor is transported into an enclosed filter in the solvent removal system; to which solvent removal system the desolvation system is connected; which enclosed filter is made of a material which allows solvent vapor to diffuse therethrough but which retains nebulized sample particles therein; which solvent vapor diffuses through said enclosed filter and is condensed and removed by application of a low temperature in the solvent removal system; and which nebulized sample particles are further transported to the input port of a sample analysis system for analysis therein; the transport of which nebulized sample solution droplets and nebulized sample particles through the desolvation and solvent removal systems to the sample analysis system being effected by a pressure gradient created by application of a pressure at the sample analysis system which is below the pressure present in the aerosol chamber.

* * * * *